(12) United States Patent
Chang et al.

(10) Patent No.: US 8,428,781 B2
(45) Date of Patent: Apr. 23, 2013

(54) SYSTEMS AND METHODS OF COORDINATION CONTROL FOR ROBOT MANIPULATION

(75) Inventors: Chu-Yin Chang, Plano, TX (US); James English, Newton, MA (US); Neil Tardella, West Haven, CT (US); James Bacon, Bourbonnais, IL (US)

(73) Assignee: Energid Technologies, Inc., Cambridge, MA (US)

( * ) Notice: Subject to any disclaimer, the term of this patent is extended or adjusted under 35 U.S.C. 154(b) by 533 days.

(21) Appl. No.: 12/620,482

(22) Filed: Nov. 17, 2009

(65) Prior Publication Data

US 2010/0152899 A1    Jun. 17, 2010

Related U.S. Application Data

(60) Provisional application No. 61/115,461, filed on Nov. 17, 2008, provisional application No. 61/115,468, filed on Nov. 17, 2008.

(51) Int. Cl.
*G05B 15/00* (2006.01)

(52) U.S. Cl.
USPC .......... 700/262; 700/245; 700/261; 700/263; 74/490.04; 104/53; 180/19.1; 244/190; 378/21; 600/118

(58) Field of Classification Search ............... 700/245, 700/261, 263; 74/490.04; 104/53; 180/19.1; 244/190; 378/21; 600/118
See application file for complete search history.

(56) References Cited

U.S. PATENT DOCUMENTS

| 4,527,446 A | 7/1985 | Borodin |
| 5,182,506 A | 1/1993 | Soon-Ho |
| 5,550,953 A * | 8/1996 | Seraji .......................... 700/263 |
| 5,737,500 A | 4/1998 | Seraji et al. |
| 5,933,828 A | 8/1999 | Eitel et al. |
| 6,278,902 B1 | 8/2001 | Hashimoto et al. |
| 6,362,813 B1 | 3/2002 | Worn et al. |
| 6,438,456 B1 | 8/2002 | Feddema et al. |
| 6,445,964 B1 | 9/2002 | White et al. |
| 6,487,717 B1 | 11/2002 | Brunemann et al. |

(Continued)

OTHER PUBLICATIONS

Yang et al. "Nonlinear Adaptive Control for Manipulator System with Gear Backlash," Proc of the 35th Conference on Decision and Control, Kobe, Japan, Dec. 1996, pp. 4369-4374.

(Continued)

*Primary Examiner* — James Trammell
*Assistant Examiner* — Sanjeev Malhotra
(74) *Attorney, Agent, or Firm* — Holland & Knight LLP; Brian J. Colandreo; Mark H. Whittenberger

(57) ABSTRACT

Disclosed herein are systems and methods for controlling robotic apparatus having several movable elements or segments coupled by joints. At least one of the movable elements can include one or more mobile bases, while the others can form one or more manipulators. One of the movable elements can be treated as an end effector for which a certain motion is desired. The end effector may include a tool, for example, or represent a robotic hand (or a point thereon), or one or more of the one or more mobile bases. In accordance with the systems and methods disclosed herein, movement of the manipulator and the mobile base can be controlled and coordinated to effect a desired motion for the end effector. In many cases, the motion can include simultaneously moving the manipulator and the mobile base.

21 Claims, 20 Drawing Sheets

U.S. PATENT DOCUMENTS

| | | | |
|---|---|---|---|
| 6,757,587 B1* | 6/2004 | English et al. | 700/245 |
| 2003/0083673 A1 | 5/2003 | Tierney et al. | |
| 2003/0106455 A1* | 6/2003 | Weston | 104/53 |
| 2003/0109780 A1 | 6/2003 | Coste-Maniere et al. | |
| 2004/0250644 A1* | 12/2004 | Gosselin et al. | 74/490.04 |
| 2007/0131822 A1* | 6/2007 | Stallard | 244/190 |
| 2007/0163816 A1* | 7/2007 | Schena et al. | 180/19.1 |
| 2007/0253529 A1* | 11/2007 | Seppi | 378/21 |
| 2009/0306825 A1* | 12/2009 | Li et al. | 700/261 |
| 2009/0326324 A1* | 12/2009 | Munoz Martinez et al. | 600/118 |

OTHER PUBLICATIONS

Zghal et al. "An Efficient Gradient Projection Optimization for Manipulators with Multiple Degrees of Redundancy," Proc. IEEE 1990 Int. Conf. Robot. and Automat., Cincinnati, OH, May 13-18, 1990, pp. 1006-1011.

Seraji, H. "Configuration Control of Redundant Manipulators: Theory and Implementation", IEEE Transactions on Robotics and Automation, vol. 5, Aug. 1989, pp. 472-490.

Daly, J. et al. "World Wide Web Consortium Issues XML Schema as W3C Recommendation"; http://www.w3.org/2001/05/xml-schema-pressrelease, May 2, 2001; downloaded Sep. 12, 2012 (3 pgs.).

DeJesus, E. X. "XML Enters the DBMS Arena", Computerworld, Oct. 30, 2000, pp. 80-82; http://www.computerworld.com/cwi/story/0.1199.NAV47_STO53026.00.html.

Ambrose, R. O. et al. "The Minimum Form of Strength in Serial, Parallel and Bifurcating Manipulators", Proceeding of the 1998 IEEE International Conference on Robotics and Automation, Leuven, Belgium, May 1998, pp. 1334-1339.

Baillieul, J. "Kinematic Programming Alternatives for Redundant Manipulators," Proc. 1985 IEEE Int. Conf. Robot. Automat., St. Louis, MO, Mar. 25-28, 1985, pp. 722-728.

Baraff, D. "Coping with Friction for Non-Penetrating Rigid Body Simulation," Siggraph 1991, Las Vegas, vol. 25, No. 4, Jul. 1991, pp. 31-40.

Buschmann. F. et al. "Pattern-Oriented Software Architecture -A System of Patterns,"John Wiley & Sons, 1996, pp. 1-457.

Caterpillar hydraulic mechanisms, http://www.cat.com/cda/search/search/search?v:file=viv_mPDZd3&v:state=root|root-0-10|0&x=7&s=25&query=hydraulic+excavators, downloaded Oct. 21, 2012 (2 pgs.).

Cheok, K. C. et al. "Modeling and Identification of a Class of Servomechanism Systems with Stick-Slip Friction," Journal of Dynamic Systems, Measurement, and Control, vol. 110, Sep. 1988, pp. 324-328.

Craig, J. J. "Introduction to Robotics," Reading, MA, Addison-Wesley Publishing Company, 1989, pp. 1-450.

Doty, K.L. et al. "Robot Manipulability," IEEE, Transactions on Robotics and Automation, vol. 11, No. 3, Jun. 1995, pp. 462-468.

Eberly, D. H. "3D Game Engine Design", Morgan Kaufmann Publishers, 2000, pp. 1-561.

Egeland, O. "Task Space Tracking with Redundant Manipulators", IEEE Jouranl of Robotics and Automatomation, vol. RA-3, No. 5 , Oct. 1987, pp. 471-475.

English, J. D. "An Improved Manipulator Dynamics Algorithm", University of Florida, Masters Thesis, 1991. (262 pages).

English, J. D. et al. "Fault Tolerance for Kinematically Redundant Manipulators: Anticipating Free-Swinging Joint Failures", IEEE Transactions on Robotics and Automation,vol. 14, No. 4, Aug. 1998, pp. 566-575.

English J. D. et al. "Numerical Integration and Digital-Model Updates in the AIM-9X Simulation", Jun. 1998, Second Annual Systems Engineering Symposium, Waltham, MA, (8 pgs.).

English J. D. et al. "On the Implementation of Velocity Control for Kinematically Redundant Manipulators," IEEE Trans. on Systems, Man, and Cybernetics-Part A: Systems and Humans, vol. 30, No. 3, May 2000, pp. 233-237.

Featherstone, R. "Robot Dynamics Algorithm," Kluwer Academic Publishers, 1987, pp. 1-211.

Feistel cipher, http://en.wikipedia.org/w/index.php?title=Feistel cipher&oldid=111030203, In Wikipedia, The Free Encyclopedia, Feb. 26, 2007, downloaded Feb. 28, 2007, (3 pgs.).

Fijany, A. et al. "An Efficient Algorithm for Computation of Manipulator Inertia Matrix," Journal of Robotic Systems, 7(1), 1990, pp. 57-80.

Force dimension haptic devices, http://www.forcedimension.com/products; downloaded Oct. 15, 2012 (2 pgs.).

Hou M. et al. "Teleoperation Characteristics and Human Response Factor in Relation to a Robotic Welding System", 1996, IEEE, Proc. IROS, vol. 3, pp. 1195-1202.

Huang, M. Z. et al. "Optimal Rate Allocation in Kinematically Redundant Manipulators-The Dual Projection Method", Proceedings of the 1991 IEEE International Conference on Robotics and Automation, Sacramento, California, Apr. 1991, pp. 702-707.

Hunter I. W. et al. "A Comparison of Muscle with Artificial Actuators", Technical Digest of the IEEE Solid-State Sensor and Actuator Workshop, Hilton Head, South Carolina, 1992, pp. 178-185.

Karnopp, D. "Computer Simulation of Stick-Slip Friction in Mechanical Dynamic Systems," Transactions of the ASME, vol. 107, Mar. 1985, pp. 100-103.

Kelly, C. T. "Iterative Methods for Optimization," SIAM, 1999, pp. 1-180.

Klein, C. A. et al. "Review of Pseudo inverse Control for Use with Kinematically Redundant Manipulators," IEEE Trans. on Systems, Man, and Cybernetics, vol. SMC-13, Mar./Apr. 983, pp. 245-250.

Lilly, K.W. "Efficient Dynamic Simulation of Robotic Mechanisms", Kluwer Academic Publishers, 1993, pp. 1-136.

Luh et al. "On-Line Computational Scheme for Mechanical Manipulators," Journal of Dynamic Systems, Measurement, and Control, vol. 102, Jun. 1980, pp. 69-76.

Madden, J. D. W. et al. "Artificial Muscle Technology Physical Principles and Naval Prospects," IEEE Journal of Oceanic Engineering; Jul. 2004, vol. 29, No. 3, pp. 706-728.

Maxon motor, http://www.maxonmotorusa.com/maxon/view/content/applications_robotics_5finger; downloaded Oct. 15, 2012 (2 pgs.).

Mimic haptic devices (MANTIS), http://www.mimicsimulation.com/products/; downloaded Oct. 15, 2012 (2 pgs.) www.mimicsimulation.com/products/Mimic-Mantis-Brochure.pdf.

Needham, R. M. et al. "Tea extensions" Technical report, Computer Laboratory, University of Cambridge, Oct. 1997, pp. 1-4.

Nelder, J. A. et al. "A Simplex Method for Function Minimization," Computer Journal, 1965, vol. 7, pp. 308-313.

Paul, R. P. "Robotic Manipulators: Mathematics, Programming, and Control," Cambridge, MA, MIT Press, 1981, pp. 1-279.

Pratt G. A. et al. "Series Elastic Actuators", Proceedings IEEE/RSJ International Conference on Intelligent Robots and Systems, 1995, vol. 1, pp. 399-406.

Queen et al. "Momentum-Based Dynamics for Spacecraft with Chained Revolute Appendages," NASA 2005 Flight Mechanics Symposium, Greenbelt, MD, Oct. 18-20, 2005, pp. 1-13.

SEDRIS Web Site, http://www.sedris.org/it_is.htm; downloaded Oct. 15, 2012 (3 pgs.).

Sensable haptic devices (PHANTOM), http://www.sensable.com; downloaded Oct. 15, 2012 (4 pgs.).

Seraji, H. et al. "Improved Configuration Control for Redundant Robots," Journal of Robotic Systems, vol. 7, No. 6, 1990 pp. 897-928.

Shoemake, K. "Animating Rotation with Quaternion Curves," SIGGRAPH, vol. 19, No. 3, San Francisco, CA, Jul. 22-26, 1985, pp. 245-254.

Skype API, https://developer.skype.com/skype-uris-program/skype-uri-ref; downloaded Oct. 22, 2012, (4 pgs.).

Spong, M. W. "Modeling and Control of Elastic Joint Robots," Journal of Dynamic Systems, Measurement, and Control, vol. 109, 1987, pp. 310-319.

Sykora, S. "Volume Integrals over n-Dimensional Ellipsoids" [online], Stan's Library, v. 1, 2005, http://www.ebyte.it/library/docs/math05a/nDimEllipsoidVolumes05.html (4 pages).

The Boost Iostreams Library, http://www.boost.org/doc/libs/1_51_0/libs/iostreams/doc/quick_reference.html, May 25, 2007; downloaded Oct. 15, 2012 (5 pgs.).

Torczon, V. "On the Convergence of Pattern Search Algorithms," Siam J. Optimization, vol. 7, No. 1, 1997, pp. 1-25.

Torczon, V. "Multi-Directional Search: A Direct Search Algorithm for Parallel Machines," Ph.D. Thesis, Rice University, 1989. (114 pages).

Walker, M. W. et al. "Efficient Dynamic Computer Simulation of Robotic Mechanisms," Journal of Dynamic Systems, Measurement, and Control, vol. 104, 1982, pp. 205-211.

XML Database Products Web Site, Dec. 2000, www.rpbourret.com/xml/XMLDatabaseProds.htm, published on the internet before Apr. 4, 2003, downloaded Oct. 17, 2012.

XTEA, http://en.wikipedia.org/w/index.php?title= XTEA&oldid=98176875, In Wikipedia, The Free Encyclopedia, Jan. 3, 2007, downloaded Mar. 1, 2007, (4 pgs.).

* cited by examiner

SYSTEMS AND METHODS OF COORDINATION CONTROL FOR ROBOT MANIPULATION

REFERENCE TO RELATED APPLICATIONS

This application claims the benefit of priority of U.S. Provisional Application No. 61/115,461, titled "SYSTEM AND METHOD OF COORDINATION CONTROL FOR ROBOT MANIPULATION" and filed Nov. 17, 2008, and also claims the benefit of priority of U.S. Provisional Application No. 61/115,468, titled "HUMAN-ROBOT MANIPULATION FOR COMPLEX OPERATIONS" and filed Nov. 17, 2008, both of which are hereby incorporated by reference in its entirety.

FEDERALLY SPONSORED RESEARCH AND DEVELOPMENT

This invention was made with Government support under contract no. N66001-07-M-1079 with the Space & Naval Warfare Systems Center of the U.S. Navy and contract NNC06CA27C with NASA Jet Propulsion Laboratory. The U.S. Government has certain rights in the invention.

FIELD

The present application generally relates to systems and methods for controlling robotic apparatus such as, for example, manipulators, arms, and mobile bases.

BACKGROUND

Robotic apparatus, e.g., of the type making up remote autonomous agents, often act (or execute instructions) according to control software implementing one or more control algorithms. Those control algorithms transform input from, e.g., a user or sensors, into robotic action.

Robotic systems are increasingly called upon to perform ever more complicated types of tasks. Such tasks often require complex coordination amongst various elements of a robotic system. However, coordinating control amongst several robotic elements (e.g., a moving arm, tool attached to the arm, mobile base, legs, and so on) has proven difficult and remains computationally intensive. Of particular difficulty is the coordination of simultaneous control (e.g., to effect simultaneous motion) of one or more arms with one or more mobile bases based on a desired motion of, for example, one element of the system. Further, user interfaces for controlling such robotic apparatus can be limited in the information they provide to a user as the user attempts to direct the action of the robot.

Accordingly, there is a need for improved systems and methods for coordinating control of various elements making up a robotic apparatus, and for improved user interfaces for controlling robotic apparatus.

SUMMARY

The present application is generally directed to methods and systems for coordinated control of robotic systems, including coordinated control of robotic systems that include a mobile base and an articulating arm. In many cases, the systems and methods of the invention allow for simultaneous movement of the base and the arm so as to transition a robot from an initial state (e.g., characterized by an initial position and pose or angular orientation) to a desired final state. In some implementations the base and the arm are modeled as a plurality of links or elements. A control vector is formed by concatenating components corresponding to the time rate of change of position of the link associated with the base (e.g., linear and angular velocities of the base) with the respective components corresponding to other links that are associated, e.g., with the arm. The optimal values of the components of the control vector(s) for motion in the next and subsequent time intervals can be determined by optimizing a merit function, e.g., which can be a scalar function in many implementations. Control signals based on the optimized values of the control vector components are applied to the base and one or more elements of the arm to cause motion. In many cases, the motion of the base and one or more elements of the arm is concurrent.

In one aspect, a method is disclosed for controlling a robotic apparatus which includes a plurality of movable elements coupled to one another via one or more joints defining one or more degrees of freedom of movement for each of the movable elements, at least one of the movable elements comprising a mobile base for the apparatus. The control method can include receiving input signals indicating a desired position or motion constraint for at least one of the movable elements, and generating, based on the input signals, a plurality of control signals to control movement of the mobile base and at least one other movable element to achieve the desired motion by optimizing a pre-defined scalar function of the motion and positions of the movable elements and the mobile base. The method further includes applying the control signals to the mobile base and the at least one other movable element to concurrently move the mobile base and the at least one other movable element to effect the desired motion. In some cases, the method can include applying the control signals to one or more actuators coupled to the one or more movable elements to effect the desired motion.

In some embodiments, the plurality of movable elements included in the robotic apparatus can form or include a robotic arm(s) or mobile base(s). In some embodiments, at least one of the movable elements includes or represents an end effector. The end effector can be a tool such as a gripper, a cutter, a saw, a haptic element, or a multi-fingered end effector. In many embodiments, at least one of the movable elements (in many cases, the mobile base) provides contact with the environment (e.g., the external environment) for the purpose of locomotion. The mobile base can include any of a wheel, a track, and a rail, or in other embodiments, any of a digging, climbing, and spelunking apparatus, and in other embodiments, any of a boat, submarine, and hovercraft, and in yet other embodiments, any of an airplane, helicopter, and lighter-than-air vehicle. The mobile base can have two or more degrees of freedom of movement comprising linear velocity and angular velocity. In some cases the mobile base can be constrained in its movement, e.g., for modeling a device operating on a track, for example, which may not be able to move laterally. In some cases, the movable elements of the robotic apparatus exhibit, collectively, at least seven degrees of freedom of movement.

In some embodiments, the input signals can be generated by a user input device, and/or can be over any of audio signal, electromagnetic signal, or a computer network. In some embodiments, the method can include displaying (e.g., via a user display such as a computer screen, and in some cases simultaneously displaying) a plurality of views of the robotic apparatus pose, and allowing the user to control the robotic apparatus from each of the plurality of views with the user input device. As one skilled in the art will understand, other views, to which the user cannot switch to effect control purposes, can additionally be included. The user input device can require only a single user action to switch control between the plurality of views. The single user action can include, for example, a mouseclick, a mouseover, a selection from a menu, a touch on a touch sensitive screen, a depression of a key or other tactile sensor, or a command-line entry (e.g., in a text-based interface). In some embodiments, the method can include displaying a plurality of views of the robotic apparatus pose, allowing a user to control the robotic apparatus from each of the plurality of views, and automatically updating each of plurality of the views based on a user's control input in any one view. In some embodiments, the plurality of views can include rendered views.

In some embodiments, the scalar function (also referred to as a merit function herein) can be associated with any of: kinetic energy associated with movement of the robotic apparatus, a gradient of potential energy associated with movement of the robotic apparatus, singularity avoidance, accuracy, joint-limit avoidance, obstacle avoidance. The scalar function can signify a constraint on movement of at least one movable element. In some cases, the scalar function can be defined by:

$$\mu = \frac{1}{2}\dot{q}^T W \dot{q} + \alpha \dot{q}^T F.$$

where q is a n-length vector representation of the positions of the one or more joints and the mobile base; with $\dot{q}$ being its time derivative (change in position over time); W is a matrix function W(q); F is a vector function of configuration; and α is a scalar function of configuration. The parameters W, F and α can be selected to define a control strategy for controlling the robotic apparatus.

In yet other embodiments, the generation of control signals in the control method can include determining control vectors (e.g., $\dot{q}$) using the following equation:

$$\dot{q} = \begin{bmatrix} J \\ N_J^T W \end{bmatrix}^{-1} \begin{bmatrix} V \\ -\alpha N_J^T F \end{bmatrix}$$

where q is a n-length vector representation of the positions of the one or more joints and the mobile base; with $\dot{q}$ being its time derivative (change in position over time); V is a m-length vector representation of desired motion of at least one of the plurality of movable elements; J is an (m×n) manipulator Jacobian; $N_J^T$ is an n×(n−m) set of vectors defined such that $JN_J^T=0$; W is a matrix function of q; F is a vector function of q; and α is a scalar function of q. In some embodiments, V can be specified (e.g., by a user) for several of, the majority of, or all of the plurality of movable elements.

In another aspect, a robotic system is disclosed which includes a plurality of movable elements coupled to one another via one or more joints defining one or more degrees of freedom of movement for each of the movable elements, at least one of said movable elements comprising a mobile base. The robotic system can also include a user input device for receiving input signals indicating a desired position or motion constraint for at least one point on one of the movable elements, and one or more processors coupled to the input device and generating a plurality of control signals to control movement of the mobile base and at least one other movable element to achieve the desired motion by optimizing a predefined scalar function of motion and positions of the movable elements and the mobile base. The robotic system can further include one or more actuators coupled to the plurality of movable elements and to the one or more processors, the one or more actuators effecting the desired motion by concurrently moving the mobile base and the at least one other movable element in accordance with the control signals.

A wide array of variations are possible. For example, in one embodiment, at least one of the movable elements can comprise an end effector which includes any of a gripper, a cutter, a saw, a haptic element, a multi-fingered end effector. In some embodiments, the base can include any of a wheel, a track, and a rail. In some embodiments, the plurality of movable elements comprise a robotic arm and a mobile base.

In yet further embodiments, the scalar function can be defined by:

$$\mu = \frac{1}{2}\dot{q}^T W \dot{q} + \alpha \dot{q}^T F.$$

where q is a n-length vector representation of the positions of the one or more joints and the mobile base; with $\dot{q}$ being its time derivative (change in position over time); W is a matrix function W(q); F is a vector function of configuration; and α is a scalar function of configuration.

In some embodiments, the system can further include an operator control unit that (i) displays a plurality of views of the robotic apparatus pose (e.g., via a user display), and (ii) allows a user to control the robotic apparatus from each of the plurality of the views (e.g., via the aforementioned user input device, which can be incorporated into or part of the operator control unit). The operator control unit (e.g., via its software user interface) can require only a single user action to switch control between the plurality of views. In some embodiments, the system can include an operator control unit that (i) displays a plurality of views of the robotic apparatus pose, (ii) allows a user to control the robotic apparatus from each of the plurality of views, and (iii) automatically updates each of the plurality of views based on a user's control input in any one view. In some embodiments, the plurality of views can include a plurality of rendered views.

In another aspect, a robotic system is disclosed which includes a plurality of movable elements coupled to one another via one or more joints defining one or more degrees of freedom of movement for each of the movable elements, at least one of said movable elements comprising a mobile base. The system can further include a user input device for receiving input signals indicating a desired motion for at least one point on one of the movable elements, and one or more processors receiving the input signals and generating a plurality of control signals to control movement of the mobile base and at least one other movable element to achieve the desired motion. Further, the system can include one or more actuators coupled to the plurality of movable elements and to the one or more processors, the one or more actuators effecting the desired motion by concurrently moving the mobile base and the at least one other movable element in accordance with the control signals. In many embodiments, the one or more processors can generate the control signals using the following equation:

$$\dot{q} = \begin{bmatrix} J \\ N_J^T W \end{bmatrix}^{-1} \begin{bmatrix} V \\ -\alpha N_J^T F \end{bmatrix}$$

where q is a n-length vector representation of the positions of the one or more joints and the mobile base; with $\dot{q}$ being its time derivative; V is a m-length vector representation of desired motion of at least one point of one of the plurality of movable elements; J is an (m×n) manipulator Jacobian; $N_J^T$ is an n×(n−m) set of vectors defined such that $JN_J^T=0$; W is a matrix function W(q); F is the gradient of scalar function $f(q)$; α is a scalar. In some embodiments, V can be specified (e.g., by a user) for several of, the majority of, or all of the plurality of movable elements. In many cases, the parameters W, F and α are user-selected to define a control strategy for controlling the robotic apparatus. Further, in some embodiments, the one or more processor can generate the control signals so as to optimize a merit function defined as:

$$\mu = \frac{1}{2}\dot{q}^T W \dot{q} + \dot{q}^T F \alpha$$

where μ represents a parameter to be optimized that reflects the control strategy.

In some embodiments, the system can further include an operator control unit that (i) displays a plurality of views of the robotic apparatus pose (e.g., via a user display), and (ii) allows a user to control the robotic apparatus from each of the plurality of views (e.g., via a user input device). The operator control unit (e.g., via its software user interface) can require only a single user action to switch control between a plurality of the views. Further, in some embodiments, the system can include an operator control unit that (i) displays a plurality of views of the robotic apparatus pose, (ii) allows a user to control the robotic apparatus from each of the plurality of the views, and (iii) automatically updates each of the plurality of views based on a user's control input in any one view. In some embodiments, the plurality of views can include a plurality of rendered views.

In another aspect, a method is disclosed for controlling a robotic apparatus which includes a plurality of movable elements coupled to one another via one or more joints defining one or more degrees of freedom of movement (and in some cases at least seven degrees of freedom of movement, and in other cases more than seven) for each of the movable elements, with at least one of the movable elements comprising a mobile base for the apparatus. The control method can include input signals indicating a desired motion for at least one point on one of the movable elements, which can be treated as an end effector element. The method can further include determining, based on the desired motion of the at least one point on the end effector element, a plurality of control vectors representing position changes for the one or more joints and the mobile base to achieve the desired motion. The control vectors can represent time rate of position change, for example, and they can be determined so as to optimize a merit function associated with a user-desired control strategy. The control vectors are applied to the mobile base and the at least one other movable element to concurrently move the mobile base and the at least one other movable element and effect the desired motion.

In some embodiments, the method can further include modeling the plurality of movable elements as a plurality of links, at least one link modeling the mobile base ("base link"), at least one link including at least one point for which a desired motion is sought ("end effector link"), and at least one link representing an aspect link, the movement of other links being determined in relation to the aspect link.

In another aspect, a method is disclosed for controlling a robotic apparatus which includes a plurality of movable elements coupled to one another via one or more joints defining one or more degrees of freedom of movement for each of the movable elements, at least one of said movable elements comprising a mobile base for the apparatus. The control method can include receiving input signals indicating a desired motion for at least one point on one of the movable elements, and calculating, with a digital data processor, a plurality of control signals to control movement of the mobile base and at least one other movable element. Further, those control signals can be applied to the mobile base and the at least one other movable element to concurrently move the mobile base and the at least one other movable element and effect the desired motion. The calculation of the control signals can use the equation:

$$\dot{q} = \begin{bmatrix} J \\ N_J^T W \end{bmatrix}^{-1} \begin{bmatrix} V \\ -\alpha N_J^T F \end{bmatrix}$$

where q is a n-length vector representation of the positions of the one or more joints and the mobile base; with $\dot{q}$ being its time derivative; V is a m-length vector representation of a desired motion of the plurality of movable elements; J is an (m×n) manipulator Jacobian; $N_J^T$ is an n×(n−m) set of vectors defined such that $JN_J^T=0$; W is a matrix function W(q); F is the gradient of scalar function $f(q)$; α is a scalar. The foregoing equation can optimize the following merit function:

$$\mu = \frac{1}{2}\dot{q}^T W \dot{q} + \dot{q}^T F \alpha$$

where μ represents a parameter to be optimized that reflects a control strategy.

In another aspect, a robot is disclosed which includes a mobile base capable of moving in at least one dimension, an articulating arm coupled to the mobile base, and a control system for generating control signals for application to the base and the arm so as to move the base while concurrently changing a configuration of the arm. The control system can be configured to determine values of a plurality of velocity vectors representing time-derivative of a plurality of vectors indicative of positions of the base and a configuration of the arm and generating the control signals based on the velocity vectors. The control system can determine those velocity vector values by optimizing a merit function, which may incorporate one or more constraints associated with motion of the base and the arm.

In yet another aspect, a robotic system is disclosed which includes a plurality of movable elements coupled to one another via one or more joints defining one or more degrees of freedom of movement for each of the movable elements, at least one of said movable elements comprising a mobile base. The system can further include a user input device for receiving input signals indicating a desired motion for at least one point on one of the movable elements ("end effector element"), and one or more processors communicatively coupled to the input device and generating, based on the input signals, control vector data representing position changes for the one or more joints and the mobile base to achieve the desired motion. One or more actuators can be coupled to the plurality of movable elements and to the one or more processors, the one or more actuators effecting the desired motion by concurrently moving the mobile base and the at least one other movable element in accordance with the control vectors.

BRIEF DESCRIPTION OF THE DRAWINGS

A further understanding of various aspects of the systems and methods discussed herein can be obtained by reference to the following detailed description in conjunction with the associated drawings, in which.

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and do not limit the scope of the claims.

A variety of exemplary embodiments will be disclosed herein. The features illustrated or described in connection with one exemplary embodiment may be combined with the features of other embodiments. Such modifications and variations are intended to be included within the scope of the present application.

In many cases, the methods and systems disclosed herein can be implemented using, amongst other things, software created as directed by the teachings herein and in accordance with an object oriented programming scheme. Principles of object-oriented programming and programming languages, (e.g., C++) are known in the art. Examples of software toolkits which can be used to implement the systems and methods disclosed herein include the Actin and Selectin software toolkits, developed by Energid Technologies, Cambridge, Mass., USA. Reference will be made to these software toolkits (e.g., to certain classes available therein) throughout this application for illustrative purposes.

A. Robotic Apparatus with Base

Generally, disclosed herein are systems and methods for controlling apparatus, such as robotic apparatus or any other device requiring control. Such systems and methods include in particular those having robotic manipulators (e.g., an articulating arm with a tool such as gripper, grasper, saw, other tool, or a hand-like extremity) with a base. Although the base can be stationary, in many cases the base can be capable of moving (e.g., via wheels, tracks, or other mechanism). Many of the systems and methods disclosed herein can coordinate the control and corresponding movement of a manipulator and a mobile base. That coordinated control can be simultaneously effected across both the manipulator(s) and the base, e.g., both the manipulator and the base can be simultaneously or concurrently moved to effect to a desired motion, such a user-specified motion for an end effector, of a particular part of the robotic apparatus.

Figure 1:
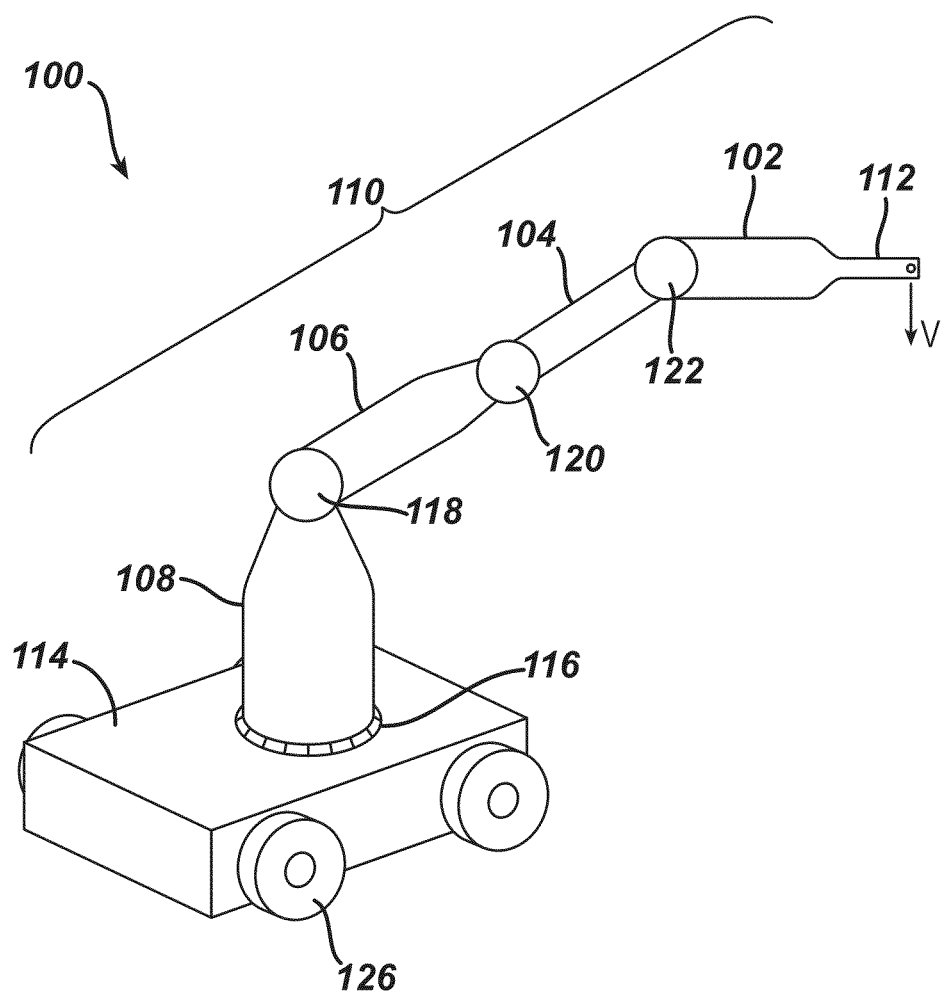
FIG. 1 schematically depicts an exemplary robotic apparatus with a manipulator and a mobile base.

FIG. 1 schematically depicts a robotic apparatus 100 made up of several movable elements 102, 104, 106, 108, 114. In this embodiment, the elements are coupled to one another via joints 116, 118, 120, 122 so as to create an articulating arm or manipulator 110 with a base 114. The base is mobile, as evidenced in FIG. 1 by several wheels 126 coupled to its sides. Virtually any other structure for moving the base could be used, such as tracks, treads, rails, cogs, propellers, jets, etc.

In this case, each of the elements 102, 104, 106, 108, 114 has one or more degrees of freedom in which it can move. Some elements may be able to move up and down (e.g., in a z-direction), side to side (e.g., in a y-direction), or extend distally (e.g., in an x-direction) or rotate, based for example on the capabilities of the joints coupling the elements to one another. Certain elements may be constrained in their movement, for example the base 114 can be on tracks limiting its sideways movement. Although any element could be so equipped, here element 102 includes a tool 112. In many cases such a tool 112, or the element 102, will be treated as an end effector, for which a particular motion is desired, however for controlling motion any element, including the base, can be treated as an end effector.

B. Control Model and Control Strategy

In one embodiment, a robotic apparatus, such as that shown in FIG. 1, can be modeled using a framework based on the manipulator Jacobian equation:

$$V = J(q)\dot{q} \quad (1)$$

where V is an m-length vector representation of the motion of one or more end effectors, which can be any movable element(s) (usually some combination of linear and angular velocity referenced to one or more points rigidly attached to parts of the robotic manipulator or the base); q is the n-length vector of joint and base positions (with $\dot{q}$ being its time derivative); and J is the m×n manipulator Jacobian, a function of q. (For spatial arms with a single end effector, V is often the frame velocity with three linear and three angular components. It can also take on a larger meaning that includes the concatenation of point, frame, or other motion of multiple end-effectors.) When the manipulator is kinematically redundant, the dimension of V is less than the dimension of q (m<n), and equation (1) is underconstrained when V is specified. By using V to represent relative motion, equation (1) can support self-connecting mechanisms by setting the relative motion to zero.

As shown in FIG. 1, element 102 can be designated as an end effector having at least one point with desired motion V.

The manipulator Jacobian specifies the rate of motion of the robot parts doing work as a function of the rates of the degrees of freedom (joints and base motion). By using rates rather than positions, a difficult nonlinear system description is converted into a tractable linear equation for control.

The velocity control question is the following: given a desired motion V, what are the rates $\dot{q}$ that best achieve this motion? To answer this, the framework uses a scalar $\alpha$, a matrix function $W(q)$, and a scalar function $f(q)$ to solve for $\dot{q}$, given V, through the following formula:

$$\dot{q} = \begin{bmatrix} J \\ N_J^T W \end{bmatrix}^{-1} \begin{bmatrix} V \\ -\alpha N_J^T F \end{bmatrix}, \tag{2}$$

where $F=\nabla f$ is the gradient of $f$ and $N_J$ is an n×(n−m) set of vectors that spans the null space of J. That is, $JN_J=0$, and $N_J$ has rank (n−m). Both $\nabla f$ and $N_J$ are generally functions of q. By changing the values of $\alpha$, W, and $f$, many velocity-control techniques can be implemented.

Equation (2) optimizes the following function:

$$\mu = \frac{1}{2}\dot{q}^T W \dot{q} + \dot{q}^T F. \tag{3}$$

Because q represents joint positions and base positions, this control approach coordinates arm and base motion—it works with wheeled, tracked, and walking mobile robots, as well as snake robots.

Equation (3) can represent a merit function whose meaning depends on the selected values of $\alpha$, W, and $f$. For example, $\alpha$, W, and $f$ can be selected such that equation (3) represents, and equation (2) thus optimizes, kinetic energy use, avoidance of kinematic singularities, and so on. Hence, a desired control strategy (e.g., a user desired control strategy) can be implemented via selection of $\alpha$, W, and $f$.

Exemplary Control Strategies

A variety of control strategies are possible. The control system is flexible and able to implement a wide variety of algorithms. For example, control types can include, without limitation, singularity avoidance, torque minimization, obstacle avoidance, fault tolerance, minimum-kinetic-energy control, minimum-potential-energy control, accuracy optimization, and joint-limit avoidance Singularity Avoidance A finite-differencing tool was developed for implementing a control strategy that includes singularity avoidance. This tool takes a pointer to function object, and uses this function to numerically calculate its gradient with respect to joint variables using the finite difference method. This is a very flexible and powerful, though somewhat costly approach. Generally, it is better to explicitly calculate the gradient whenever possible. Since the explicit calculation is not always possible, finite differencing can be used for singularity avoidance.

A manipulator experiences a kinematic singularity whenever the Jacobian loses rank. To frame the desire to avoid singularities into a solution method, a function is needed that is large at singularities and small away from singularities. For this, in some embodiments, the damped inverse of the product of the singular values of a weighted Jacobian is used. That is, the optimization function is the following:

$$f(q) = \frac{1}{\bar{\sigma}_1 \bar{\sigma}_2 \ldots \bar{\sigma}_n + \varepsilon}. \tag{4}$$

where $\varepsilon$ is a damping factor and $\bar{\sigma}_i$ is singular value i of the weighted Jacobian $J_W$:

$$J_W = D_T J D_J, \tag{5}$$

where $D_T$ and $D_J$ are diagonal matrices. The weighting matrices can define the singular values of the Jacobian.

In many cases, the singular values are not explicitly calculated, as this is too costly. Instead the Cholesky decomposition of $J_W J_W^T$ is taken, and the product of the diagonal terms is used. The product of these diagonal terms equals the product of the singular values.

In some embodiments, the gradient of the function given in equation (4) is numerically calculated for use with the basic core through the class EcControlExpressionSingularityAvoidance, which is part of the aforementioned Actin toolkit. For use with the AB core, it can be combined with EcControlExpressionVectorToAB. These can be used with a positive definite weighting matrix and a positive scalar to drive the manipulator to minimize the function and therefore move away from kinematic singularities.

Torque Minimization

For torque minimization, the function to be optimized can be defined as the following:

$$f(q)g_i^2(q), \tag{6}$$

the square of the gravitational torque or force on joint i. To calculate the gradient, in this exemplary embodiment an explicit gradient calculation method (i.e., finite differencing is not used for this) for gravitational joint torque/force based on composite rigid body inertia is used. Using this calculation method, the gradient of the torque squared is given by:

$$\nabla f(q) = 2g_i(q)\nabla g_i(q). \tag{7}$$

This is implemented in class EcControlExpressionGravitationalTorqueGradient for use with the basic core. For use with the AB core, it can be combined with EcControlExpressionVectorToAB. Using this value as the vector input to the core control system with a positive definite weighting matrix and a positive scalar produces control that minimized the magnitude of the gravitational torque on joint i. This can be used to prevent stress on a particular joint, or it can be used for failure recovery after a free-swinging failure. For more information, see "Fault Tolerance for Kinematically Redundant Manipulators: Anticipating Free-Swinging Joint Failures," J. D. English and A. A. Maciejewski, IEEE Transactions on Robotics and Automation, vol. 14, pp. 566-575, 1998, which is hereby incorporated by reference.

Minimum Kinetic Energy Control

To minimize kinetic energy, the matrix parameter to the control system is set to be the manipulator mass matrix, and the scalar parameter is set to zero. That is, $$W = M(q), \tag{8}$$

$$\alpha = 0. \tag{9}$$

In this case, when α=0, the vector parameter is not relevant. There are two classes for implementing this control strategy. For use with the basic core, EcControlExpressionMassMatrix returns the manipulator mass matrix—M(q) in equation (8)—directly for use as weighting parameter W. The manipulator mass matrix is calculated using the method of Composite Rigid-Body Inertia (developed in "Efficient Dynamic Computer Simulation of Robotic Mechanisms," M. W. Walker and D. E. Orin, *Journal of Dynamic Systems, Measurement, and Control*, vol. 104, September 1982, pp. 205-211 and named in Robot Dynamics Algorithms, R. Featherstone, Kluwer Academic Publishers, 1987, both of which are hereby incorporated by reference), which is extended to apply to bifurcating arms. The same algorithm is used to calculate the mass matrix for minimum-kinetic-energy control as is used to calculate the composite-rigid-body dynamics. For use with the AB core, an A parameter corresponding to the manipulator mass matrix as W is calculated by treating the Jacobian-null-space basis vectors as accelerations and calculating the corresponding joint torques. In this exemplary embodiment, for this calculation the iterative Newton Euler algorithm is used; for more information see "On-Line Computational Scheme for Mechanical Manipulators," J. Y. S. Luh, M. W. Walker, and R. P. C. Paul, Journal of Dynamic Systems, Measurement, and Control, vol. 102, pp. 69-76, June 1980, which is hereby incorporated by reference.

Minimum Potential Energy Control

To minimize the potential energy of the arm, the gradient of the potential energy is used. For articulated mechanisms, the gradient of potential energy is composed of gravitational joint torques. To calculate the gravitational joint torques (forces for prismatic joints) the composite rigid-body inertia of the links is used. This method is implemented for the basic core in the class EcControlExpressionPotentialEnergyGradient.

Accuracy Optimization

For accuracy optimization in the presence of position errors in a single joint, an F value is provided for the basic core through the class EcControlExpressionError Sensitivity. For this calculation, a weight $w_i$ is assigned to each of E end-effectors on the manipulator, and a focus joint, j, is identified. Then an error sensitivity function is defined as follows:

$$f(q) = \sum_{i=1}^{E} w_i \|_j v_i\|^2, \qquad (10)$$

where $_j v_i$ is the velocity of end-effector i due to unit motion of joint j.

The gradient of this function is then found using finite differencing, and this is used as the vector parameter for the core velocity control system. With the matrix parameter being a diagonal matrix and the scalar parameter a positive value, this serves to minimize the sensitivity to errors.

Joint-Limit Avoidance

Figure 2:
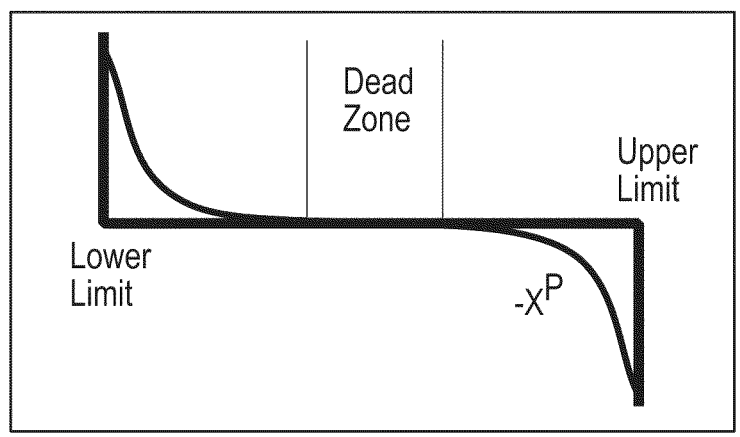
FIG. 2 shows a graph of an exemplary joint-limit avoidance function for use in connection with optimizing a merit function.

For joint-limit avoidance, for each joint, a rate term is independently calculated that is a polynomial function of the proximity to a limit. This is illustrated in FIG. 2, which shows how the vector elements for joint-limit avoidance are set using polynomials with a user-configurable exponent and dead-zone. Class EcControlExpressionJointLimitAvoidance implements this weighting function. This is used with a negative scalar value to drive the manipulator away from joint limits.

Strength Optimization

Strength optimization is achieved by employing a technique based on the strength formulation in "The Minimum Form of Strength in Serial, Parallel and Bifurcating Manipulators," R. O. Ambrose and M. A. Diftler, Proceeding of the 1998 IEEE International Conference on Robotics and Automation, Leuven, Belgium, May 1998, which is hereby incorporated by reference. In this discussion, torque is used in the general sense, meaning force for a sliding joint. For an arbitrary set of end-effector forces, a vector of joint torques can be found. The goal of strength optimization is to adjust the manipulator joint positions in such a way as to minimize the normalized joint torques resulting from the imposed forces while simultaneously placing the hand(s). This is accomplished by directing the joints toward the direction that yields the maximum reactive strength in the direction opposing the applied forces. Strength here is defined as the maximum force or moment that the manipulator can exert on its environment at the point of resolution of an end effector.

The basic formulation of velocity control used to relate joint rates to hand velocity is given by equation (1). Again, V is a concatenation of hand velocities, $\dot{q}$ is the vector of joint rates and J(q) is the manipulator Jacobian.

If friction and gravitational loads are neglected, the power flow at the joints must equal power flow at the end effector. By relating hand velocities V and corresponding wrench loads F with joint rates $\dot{q}$ and joint torques T, this property is expressed as follows:

$$V^T F = -\dot{q}^T T \qquad (11)$$

Using equation (1) with the fact that equation (11) must be true for all values of $\dot{q}$ yields $$T = -J(q)^T F \qquad (12)$$

Equation (12) relates wrench loads exerted on the system with joint torques required to prevent manipulator motion due to those loads.

When assessing the total strength of a manipulator, torque capacities for each joint must be known. The torque capacity is typically limited by the motor's ability to supply torque or the gearhead's ability to transmit torque to the joint. The torque capacity $\hat{T}$ for a given joint can be expressed as $$\hat{T} = \min(t_a G, t_t) \qquad (13)$$

where $t_a$ is the actuator (corresponding to motor) torque, G is the gear ratio (the ratio of actuator velocity to joint velocity—typically G is greater than unity) and $t_t$ is the transmission torque. The torque capacity for a joint may differ depending on direction.

To optimize manipulator configuration for strength, let x be a desired end-effector force, as would be used with F=x in equation (12). Let $\hat{T}_{max_j}$ be the maximum torque capacity, and $\hat{T}_{min_j}$ be the minimum torque capacity (the largest magnitude in the negative direction) for joint j. For an n-joint system, a measure of strength $f(q)$ is given by $$f(q) = \sum_{j=0}^{n-1} \left[ \frac{|T_j - \mu_j|}{\|\hat{T}_j\|} \right]^r, \qquad (14)$$

where $T_j$ is the actual torque required to achieve F=x using eq. (12), $\mu_j$ is the mean of the torque capacity of joint j, given by:

$$\mu_j = \frac{\hat{T}_{max_j} + \hat{T}_{min_j}}{2}, \quad (15)$$

and $\|\hat{T}_j\|$ is the range of torque capacity for joint j, given by:

$$\|\hat{T}_j\| = \hat{T}_{max_j} - \hat{T}_{min_j}. \quad (16)$$

The user-defined parameter r specifies the order of the function to optimize. Note that r=2 corresponds to a sum of squares approach and r→∞ approaches an infinity-norm approach, where the strength is defined only by the weakest joint.

The gradient of $f(q)$ is found using finite differencing, forcing the joints in the direction of minimum normalized torque and, hence, maximum strength. This gradient is calculated in the expression tree using the class EcControlExpressionStrengthOptimization. Because it is a gradient, it is for direct use with the basic core velocity control system. It can be converted to a B parameter for use with an AB core by combining it with an EcControlExpressionVectorToAB expression.

Statistical Error Reduction

For accuracy optimization in the presence of high frequency noise on multiple joints, an approach is used that exploits the statistical properties of the joint noise as well as the Euclidean Space nature of the tools the manipulator is using.

The Function for Optimization

Let the velocity error in the manipulator's joints, $\dot{q}_e$, be a random variable having covariance $C_e$. That is, the expected value of the quadratic form is given by $$E[\dot{q}_e \cdot \dot{q}_e^T] = C_e \quad (17)$$

It is assumed that the controller prevents low-frequency drift to enforce $E(\dot{q}_e)=0$. It is desired to minimize the expected value of a quadratic measure of the hand velocities due to this error. Let the error in the hand velocities be $V_e$, now also a random variable. From equation (1), the relationship between $\dot{q}_e$ and $V_e$ is $$V_e = J(q)\dot{q}_e. \quad (18)$$

Let a measure of the hand error be defined as $$\mu_e = V_e^T A V_e, \quad (19)$$

for some prescribed constant matrix A. Note $\mu_e$ is a random variable. The goal, then, is to minimize the expected value of $\mu_e$. That is, the function to be minimized is given by $$f(q) = E[\mu_e] \quad (20)$$

Combining the three above equations gives $$f(q) = E[\dot{q}_e^T J^T A J \dot{q}_e]. \quad (21)$$

To put this in a form that can be used for optimization, the following formula is used, which applies for any column vector x and any matrix M, $$x^T M x = tr(M \times x^T). \quad (22)$$

This gives $$f(q) = E[tr(J^T A J \dot{q}_e \dot{q}_e^T)]. \quad (23)$$

Here, tr(•) is the sum of the diagonal entries (the trace operator). Using $E(\dot{q}_e) = 0$, this gives $$f(q) = tr(J^T A J C_e), \quad (24)$$

a straightforward function of configuration.

Evaluating the A Matrix

The matrix A as used above can be set in a number of ways. By way of example, one approach is to use Euclidean-Space regions of interest rigidly attached to the hands. Such a region might be the physical extent of a tool, for example.

Figure 3:
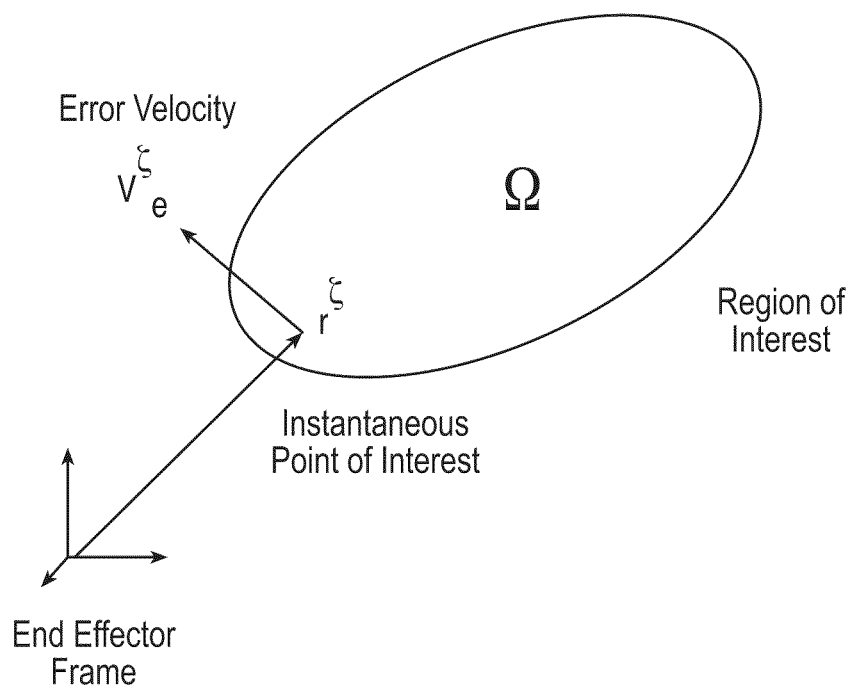
FIG. 3 shows an exemplary illustration of a model for measuring the statistical error of a Euclidean space for use in connection with optimizing a merit function.

Let the Euclidean-space region be labeled $\Omega$. Then $\mu_e$ can be cast to minimize an integral of the velocity error squared over $\Omega$. Let $\vec{r}$ be a point in $\Omega$, and let $\rho(\vec{r})$ be a nonnegative interest density function defined over $\Omega$ (specifying, for example, that the tip of a screwdriver is more important than the shaft). Let $\vec{v}_e(\vec{r})$ be defined as the error velocity at point $\vec{r}$, a random variable. These are illustrated in FIG. 3, which shows the terms used to measure the statistical error of a Euclidean Space region in the region rigidly attached to one end-effector frame.

With this, what is desired is to minimize $$f(q) = E\left[\int_\Omega \rho(\vec{r}) \|\vec{v}_e(\vec{r})\|^2 d\omega\right]. \quad (25)$$

That is, the expected value of a weighted integral of the velocity error squared of all the points in the region of interest. This is a comprehensive and intuitive measure.

It is not practical, in many cases, to calculate the integral shown in eq. (25) in real time. However, there is a way to cast it into the form of eq. (19), which will allow eq. (24) to be used with no on-line integration. To do this, an analogy is used between eq. (25) and kinetic energy of a rigid body. If $\vec{v}_e(\vec{r})$ were the velocity over the region $\Omega$ and $\rho(\vec{r})$ were the mass, then the integral in eq. (25) would provide twice the kinetic energy of the body.

Let the following be defined in analogy to mass, first moment of inertia, and second moment of inertia:

$$m_\Omega = \int_\Omega \rho(\vec{r}) d\omega, \quad (26)$$

$$h_\Omega = \int_\Omega \rho(\vec{r}) \vec{r} d\omega, \quad (27)$$

$$I_\Omega = \int_\Omega \rho(\vec{r}) R^T R d\omega, \quad (28)$$

where R is the cross product matrix for $\vec{r}$ (i.e., $Rx = \vec{r} \times x$ for any column vector x).

With these values, let the following matrix be defined:

$$J_\Omega = \begin{bmatrix} m_\Omega I & H_\Omega \\ H_\Omega^T & I_\Omega \end{bmatrix}, \quad (29)$$

where I is the 3×3 identity matrix and $H_\Omega$ is the cross-product matrix for $h_\Omega$. This produces, for a single frame end effector, the following:

$$\int_\Omega \rho(\vec{r}) \|\vec{v}_e(\vec{r})\|^2 d\omega = V_e^T J_\Omega V_e. \quad (30)$$

Equation (30) the same form as eq. (19), allowing the optimization of eq. (24) to be performed using eq. (24) with $A=J_\Omega$.

In general, there will be N end effectors, and the matrix A will be block diagonal:

$$A = \begin{bmatrix} [J_{\Omega,1}] & & & 0 \\ & [J_{\Omega,2}] & & \\ & & \ddots & \\ 0 & & & [J_{\Omega,N}] \end{bmatrix}. \quad (31)$$

Implementation of Statistical Error Reduction

Statistical error reduction is implemented through the EcControlExpressionError Reduction class. This gives a vector weight for use with the basic core velocity control system. It can be converted to a B parameter for use with an AB core by combining it with an EcControlExpressionVectorToAB expression.

End-Effector Descriptions

The array V, as used above, represents the motion of all the manipulator's end effectors. A special class can hold the description of an end-effector set, which contains any number of end effectors. The end effectors can represent any type of constraint. Implemented end-effector types include frame, 3D point, 3D orientation, 2D point, center of mass, and spatial momentup. More types can be added using the toolkit or the plugin interface.

To allow this general approach, many of calculations needed for velocity control are performed in the end-effector class. The public methods that must be implemented to define a new end effector are given in the table below.

tions allow the end-effectors to create their own Jacobians and position controllers. Subclasses of EcEndEffector include EcFrameEndEffector, EcPointEndEffector, and EcXyEndEffector.

Any of the foregoing control strategies, and others, can be implemented using a dynamically updatable control system of the type described in U.S. Pat. No. 6,757,587 of English et al. ("Method and Apparatus For Dynamically Reprogramming Remote Autonomous Agents"), which is hereby incorporated by reference in its entirety. For example, mission control can select expressions or values for one of more of α, W, and $f$ components of the control system equations, expressing those components as an XML file and communicating it to a control system (e.g., a robot). The robot can validate the XML file using an on-robot copy of the schema, and use the validated XML to create in memory, at run time and using a recursion and a creator function, a code tree structure representation of the components of which the XML file provides an expression or a value.

C. Derivation of Control Model

The exemplary control model disclosed above, including coordinating control of mobile or floating bases concurrently with an arm, will now be described in more detail.

Figure 4:
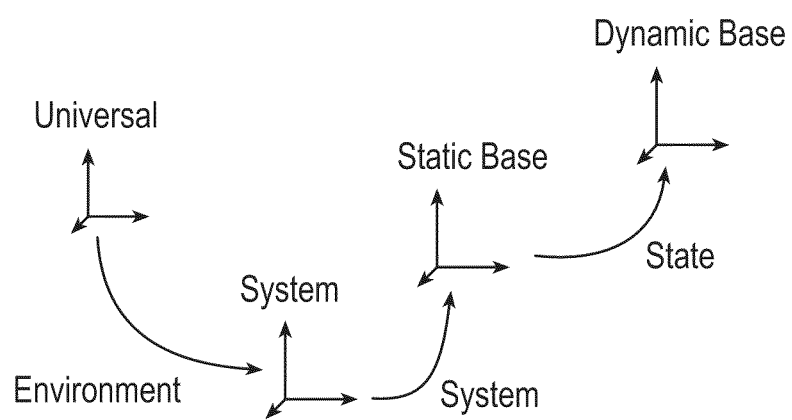
FIG. 4 shows an exemplary representation of several reference frames for a coordinated control model.

The use of mobile manipulators can be modeled using a reference-frame hierarchy. In the framework, the location of the base of each manipulator can be specified through a sequence of transformations, as illustrated in FIG. 4. The entire manipulator system is represented in the system frame, which is defined with respect to a universal reference frame as part of the environmental specification. Then, each manipulator has a static base frame whose location with respect to the

TABLE

Member functions that are implemented to define a new type of end effector.

| Member Function | Meaning |
| --- | --- |
| doc | Returns the end effector's degrees of constraint. For a point end effector, it returns 3. For a frame end effector, 6. |
| insertJacobianComponent | Builds a strip of the Jacobian. The height of the strip equals the value returned by doc. |
| insertSparsityComponent | Builds a strip of the sparsity description of the Jacobian. A value of true in this strip means the corresponding position in the Jacobian is always zero. The height of the strip equals the value returned by doc. |
| calculatePlacement | Calculates a placement value for the end effector. The placement is described through an EcCoordinateSystemTransformation, which may have different meanings for different end-effector types. |
| calculateVelocity | Calculates end-effector velocity. The result is a real vector of length equal to the value returned by doc. The velocity will have different meanings for different end-effector types. |
| calculateAcceleration | Calculates end-effector acceleration. The result is a real vector of length equal to the value returned by doc. The acceleration will have different meanings for different end-effector types. |
| filterEndEffectorVelocity | Calculates an end-effector velocity that drives the end effector toward a guide placement. The guide frame is always represented in system coordinates. |
| minimumTime | Calculates the minimum time that will be used to move from one frame to another. |
| difference | Calculates a measure of the difference between two placement frames that uses Euclidean distance as its baseline. That is, the difference between two frames is the Euclidean distance between them plus optional additional factors related to orientation change. |

Through this approach, any new end effector can be added as a subclass of EcEndEffector, provided these member functions are implemented in the new class. These member functions system frame is specified as part of the manipulator description. The (dynamic) location of the manipulator with respect to the static base frame is specified as part of the state, through the dynamic base frame. FIG. 4 illustrates the location of a manipulator's base frame. The dynamic base frame location is identified through a sequence of transformations. For mobile manipulators, the motion of the dynamic base frame is integrated with the motion of the joints.

Figure 5:
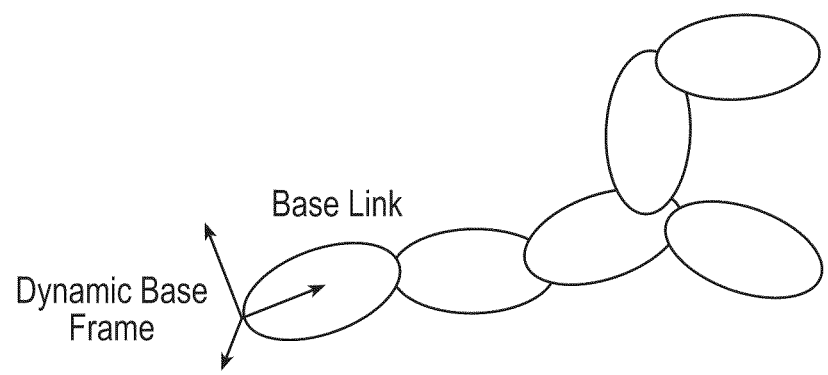
FIG. 5 shows an exemplary representation of several links for a coordinated control model.

The dynamic base frame specifies the location of the base link on the manipulator, as illustrated in FIG. 5. FIG. 5 illustrates how one link on the manipulator serves a special role as the base link. It does not have a joint associated with it. Instead, the location of the dynamic base frame determines its location. In an exemplary software implementation, in the code the base link is a subclass of the normal link type that stores information on the entire manipulator.

Aspect Link

Figure 6:
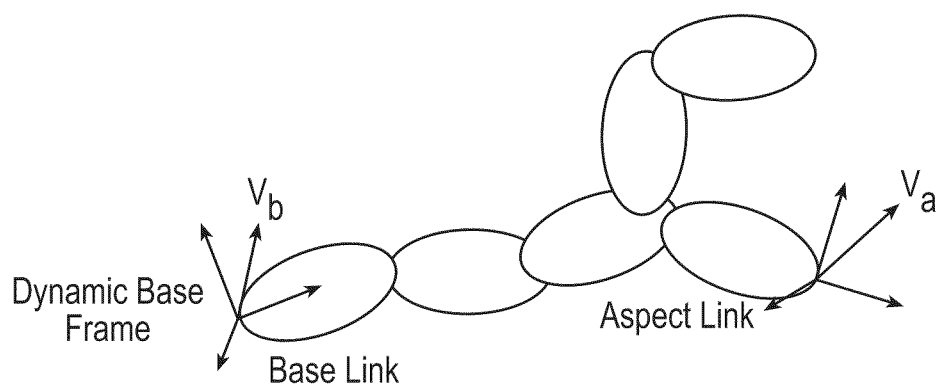
FIG. 6 shows an exemplary representation of an aspect link in the model represented by FIG. 5.

In addition to the base link, there is another link that can be used as a reference for controlling the manipulator when the base is not fixed. This is the aspect link, as shown in FIG. 6. As opposed to the base link, the aspect link is conceptual (i.e., any link can be assigned as the aspect link). As an object in code, it is just another link. FIG. 6 illustrates how one link on the manipulator serves a special conceptual role as the aspect link. It is a regular link, distinguished as the aspect link only through the control system. For a free-floating base, the frame velocity $V_a$ is used for calculating kinematic control.

Moving-Aspect Jacobian

Figure 7:
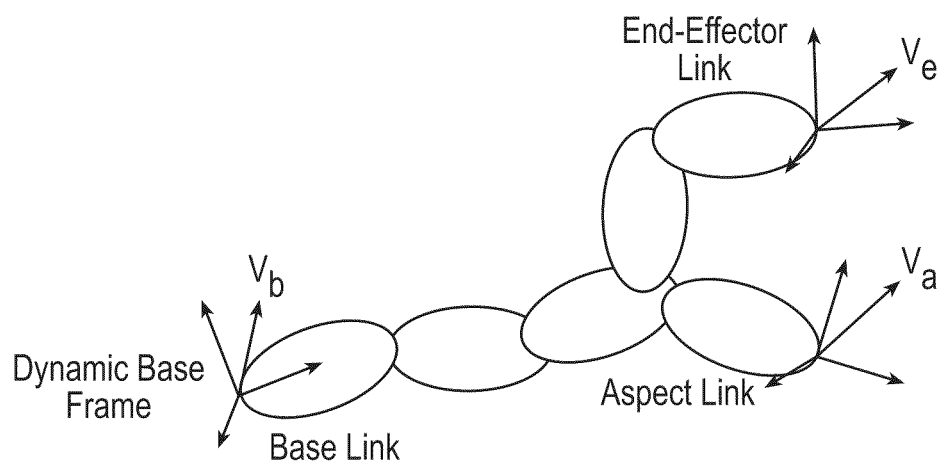
FIG. 7 shows an exemplary representation of an end effector link in the model represented by FIG. 5.

Each end effector is defined as rigidly attached to some link. This end-effector link can be any link of the manipulator, and is typically separate from both the base link and the aspect link. This is shown in FIG. 7, which depicts how the end-effector link, can be rigidly attached to the end effector for which kinematic control is desired.

For end-effector position $\vec{r}_e$ and base position $\vec{r}_b$, let $$\vec{p}_{b \to e} = \vec{r}_e - \vec{r}_b, \tag{32}$$

And, for any vector $\vec{p}$, let P be defined as:

$$P = \begin{bmatrix} I & -\vec{p}x \\ 0 & I \end{bmatrix}, \tag{33}$$

with $$P^{-1} = \begin{bmatrix} I & \vec{p}x \\ 0 & I \end{bmatrix}. \tag{34}$$

With this definition, the frame velocity of the end effector is given by:

$$V_e = J_e \dot{q} + P_{b \to e} V_b, \tag{35}$$

where $J_e$ is the manipulator Jacobian. All quantities here are assumed to be represented in the same frame.

Similarly, for the aspect link the frame velocity of the aspect frame is generally:

$$V_a = J_a \dot{q} + P_{b \to a} V_b, \tag{36}$$

where $J_a$ is the manipulator Jacobian for the aspect frame. The matrix $P_{b \to a}$ can never be singular, allowing:

$$V_b = P_{b \to a}^{-1}(V_a - J_a \dot{q}). \tag{37}$$

Combining (45) and (47) gives $$V_e = J_e \dot{q} + P_{b \to e} P_{b \to a}^{-1}(V_a - J_a \dot{q}), \tag{38}$$

Using $P_{b \to e} P_{b \to a}^{-1} = P_{a \to e}$ and collecting terms gives $$V_e = (J_e - P_{a \to e} J_a) \dot{q} + P_{a \to e} V_a, \tag{39}$$

This allows the moving-aspect Jacobian to be defined as $$J_e^{*a} = [J_e - P_{a \to e} J_a | P_{a \to e}]. \tag{40}$$

Let $\dot{q}^*_a$ be defined by concatenating $\dot{q}$ and $V_a$ as follows:

$$\dot{q}_2^* = \begin{bmatrix} \dot{q} \\ \dots \\ V_a \end{bmatrix} \tag{41}$$

Then $$V_e = J_e^{*a} \dot{q}_2^* \tag{42}$$

gives the manipulator Jacobian equations when the aspect link is moving.

Using this with $$\dot{q}_2^* = \begin{bmatrix} J_e^{*a} \\ \hline N_{J_e^{*a}}^T W_a^* \end{bmatrix}^{-1} \begin{bmatrix} V_e \\ -\alpha N_{J_e^{*a}}^T F_a^* \end{bmatrix}, \tag{43}$$

where, for N links, $W^*_a$ is an (N+6)×(N+6) symmetric matrix and $F^*$ is an (N+6)×1 column vector, gives a value of $\dot{q}^*$ that produces the desired $V_e$ while minimizing $$\mu = \frac{1}{2}(\dot{q}_a^*)^T W_a^* \dot{q}_a^* + (\dot{q}_a^*)^T F_a^*. \tag{44}$$

This is a desirable result. An arbitrary quadratic function of $\dot{q}$ and $V_a$ can be minimized this way. However, to calculate equation (43) directly involves calculating a special Jacobian as a function of the attribute frame, which can be disadvantageous in some cases.

To avoid this, there is an alternative representation that allows the regular manipulator Jacobian to be used, yet achieve the same result. More specifically, from equation (36) the following equation holds:

$$V_b = P_{a \to b} V_a - P_{a \to b} J_a \dot{q}, \tag{45}$$

Let $T_{a \to b}$ be defined as $$T_{a \to b} = \begin{bmatrix} I & 0 \\ -P_{a \to b} J_a & P_{a \to b} \end{bmatrix}, \tag{46}$$

and $$\dot{q}_b^* = \begin{bmatrix} \dot{q} \\ \dots \\ V_b \end{bmatrix}. \tag{47}$$

This gives $$\dot{q}_b^* = T_{a \to b} \dot{q}_a^*. \tag{48}$$

Let $J^*_e$ be defined as $$J_e^* = [J_e | P_{b \to e}]. \tag{49}$$

This can then be used with $$\dot{q}_b^* = \begin{bmatrix} J_e^* \\ \hline N_{J_e^*}^T (T_{a \to b}^{-1})^T W_a^* T_{a \to b}^{-1} \end{bmatrix}^{-1} \begin{bmatrix} V_e \\ -\alpha N_{J_e^*}^T (T_{a \to b}^{-1})^T F_a^* \end{bmatrix} \tag{50}$$

to give the same result as (43).

Let $$W^* = (T_{a \to b}^{-1})^T W^*_a T_{a \to b}^{-1} \quad (51)$$

and $$F^* = (T_{a \to b}^{-1})^T F^*_a. \quad (52)$$

Note $T_{a \to b}^{-1}$ has the following convenient form:

$$T_{a \to b}^{-1} = \begin{bmatrix} I & 0 \\ J_a & P_{b \to a} \end{bmatrix}. \quad (53)$$

With this, $$\dot{q}^*_b = \begin{bmatrix} J^*_e \\ NJ^{T*}_e W^* \end{bmatrix}^{-1} \begin{bmatrix} V_e \\ -\alpha NJ^T_e F^* \end{bmatrix} \quad (54)$$

gives the same manipulator motion as (43), but without the need to calculate $J^*_e{}^a$. The choice of aspect frame is incorporated only into the parameterization values W* and F* (note the structure of (54) is the same as that of (43)).

Relative Jacobians

Figure 8:
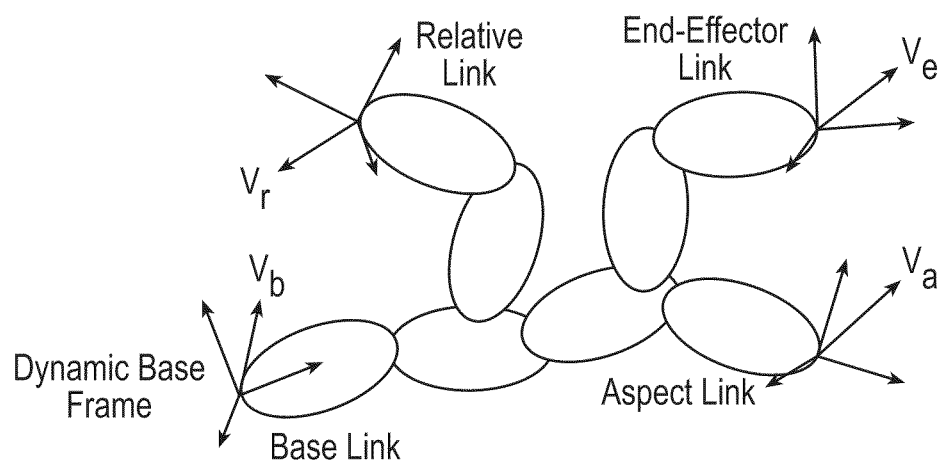
FIG. 8 shows an exemplary representation of relative links in the model represented by FIG. 5.

An end effector can be defined relative to another frame on the same manipulator. In this case, the Jacobian equation is the same whether or not the aspect link is mobile. If a relative end effector is defined, a new special link is added to the manipulator, as shown in FIG. 8. FIG. 8 illustrates how an end effector can be defined relative to any other link.

Let $^S V_e$ be the frame velocity of the end-effector with respect to and expressed in the system frame, with linear velocity $^S v_e$ and angular velocity $^S \omega_e$. The point of application for these values is $\vec{r}_e$. Similarly, Let $^S V_r$ be the frame velocity of the reference frame with respect to and expressed in the system frame, with linear velocity $^S v_r$ and angular velocity $^S \omega_r$. The point of application for these values is $\vec{r}_r$.

With these definitions, Jacobians $J_e$ and $J_r$ exist such that $$^S V_e = J_e \dot{q} + P_{b \to e} {}^S V_b. \quad (55)$$

and $$^S V_r = J_r \dot{q} + P_{b \to r} {}^S V_b. \quad (56)$$

Then the velocity of the end effector with respect to the relative frame is $$^r V_e = {}^S V_e - P_{e \to r} {}^S V_r. \quad (57)$$

The effect of $V_b$ cancels, leaving the following Jacobian:

$$J_1 = J_e - P_{e \to r} {}^S J_r. \quad (58)$$

This has no dependence on the motion of the base.

Specification of Mobile-Base Parameters

The description of the base, aspect, relative, and end-effector links should be given in the control-system description. Whether or not the aspect link is moving or stationary should be specified. Possible methods for specifying these are through the manipulator system, the manipulator state, the velocity control system, or the end-effectors.

In some implementations, the mobile-base parameters are specified as follows:

TABLE

Method by which the various components are specified.

| System | Velocity Control | End Effector |
|---|---|---|
| Base Link | Jacobian | End Effector Link |
| Base Mobility | Aspect Link Aspect Mobility | Relative Link |

D. Exemplary Hardware/Software Implementations

Figure 9:
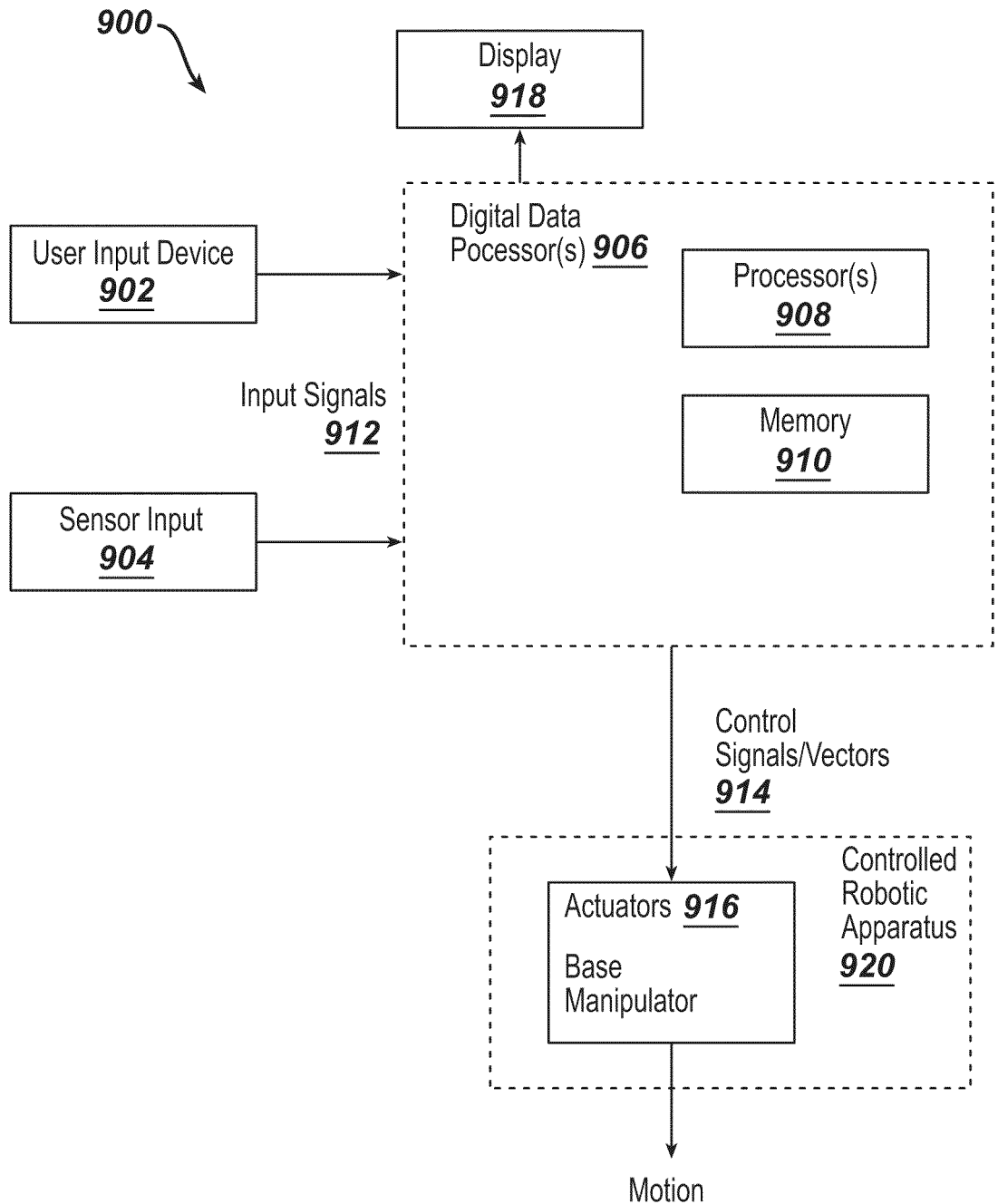
FIG. 9 shows an exemplary block diagram of a control system in accordance with the teachings herein.

FIG. 9 depicts an exemplary block diagram of a control system 900 in which input signals 912 come from, e.g., user input device 902. A user input device can include, e.g., any input device known in the art associated with a computer, such as a keyboard or mouse, screens (e.g., touchscreens), joysticks, steering wheels, and other input devices which may be tailored to the apparatus they are controlling. The input signals 912 generated by the user input device 902 can be used to input and/or indicate the desired control strategy for the control system (e.g., as represented by parameters α, W, and $f$, described above) and/or the desired motion (e.g., velocity vectors) of the apparatus (e.g., by manipulation of a joystick, for example). Input signals 912 can also be generated by sensors 904, such as machine vision, contact sensors, position sensors (e.g., GPS), gyroscopes, and so on.

In the exemplary embodiment of FIG. 9, input signals 912 are fed into digital data processor(s) 906, which can be embodied in any general or special purpose computer. In many cases the user input device 902 and user display 918 can be integrated with the digital data processor 906 in a manner known in the art to create a familiar personal computer, laptop, PDA, and so on. The digital data processor 906 can take the form of an operator control unit (OCU) with a user interface (e.g., a software interface providing a GUI or text-based interface) in accordance with the teachings herein. In some embodiments, the digital data processor 906 can be communicatively coupled, e.g., via a network, wirelessly, or otherwise, to the apparatus (e.g., apparatus 920) which it controls (e.g., for communicating control signals 914). In other embodiments, the digital data processor 906 can be embedded, e.g., within the controlled apparatus.

The digital data processor 906 includes algorithms stored on a computer-readable medium, e.g., magnetic, optical, solid-state or other storage medium. Such algorithms can effect control in accordance with the control principles disclosed herein and may include standard off-the-shelf software packages for implementing certain functionality. Such software packages may include, for example, the Actin (for effecting control) and Selectin (for machine vision) software toolkits developed by Energid Technologies of Cambridge, Mass., USA. One or more processors of any type known in the art can execute the instructions embodied in algorithmic form in view of the input signals received from the user input devices and/or sensor devices to effect control of the apparatus.

Control signals 914 generated by the digital data processor can be communicated to the controlled apparatus 920 and more particularly, in many cases, to one or more actuators 916 in such apparatus. The controlled apparatus 920 can have its own local intelligence, e.g., processing capability, for interpreting the control signals 914, translating the control signals 914 to a form appropriate for the actuators 916, and/or, in some cases, determining some or all of the control signals 914 itself. Actuators 916 may take the form of any device capable of being controlled or instructed, including motors, servos, pneumatic devices, magnetic devices, electromagnets, and so on. In some cases, the control signals 914 may be transformed to the appropriately (e.g., to an appropriate voltage, current, or communications protocol) for the actuators 914 to which they are assigned. Regardless, the actuators operate under the direction of the control signals 914 to effect the desired position changes and/or motion of each movable element of the controlled apparatus 920.

Figure 10:
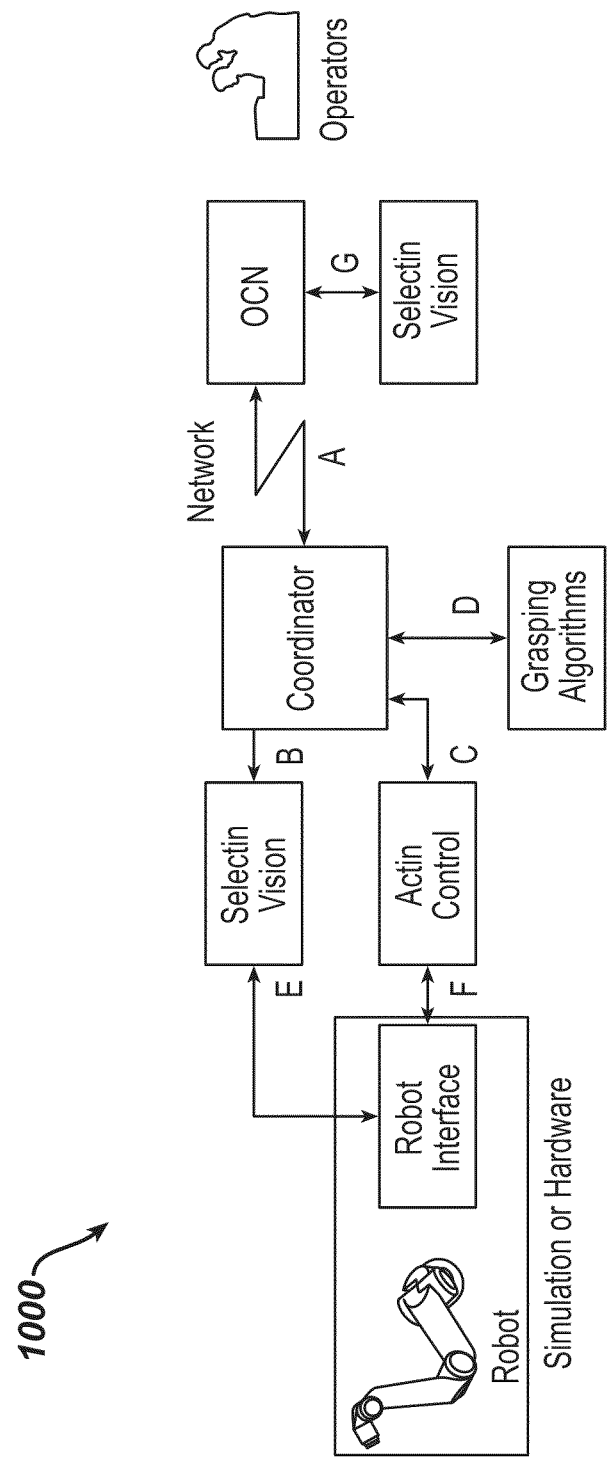
FIG. 10 shows an exemplary block diagram of a software architecture for use with the control system of FIG. 9.

FIG. 10 depicts another block diagram of an exemplary top-level software architecture 1000 for controlling an apparatus such as a robotic apparatus and references exemplary software packages, such as the above-referenced Actin and Selectin software packages. As shown in FIG. 10, information is exchanged A) between the operator control unit (OCU) and the coordinator on the robotic apparatus, B) between the coordinator and the robot Selectin-based vision module, C) between the coordinator and the Actin-based force and position control, D) between the coordinator and the grasping algorithm database, E) camera imagery from the robot platform, F) control interface for the robot platform (in some cases, a software interface provided by a robot manufacturer, e.g., Aware 2.0 for iRobot's Packbot), and G) between the OCU and the Selectin-based vision module. The robot and interface, marked with a box on the left, can be optionally real or simulated.

Figure 11:
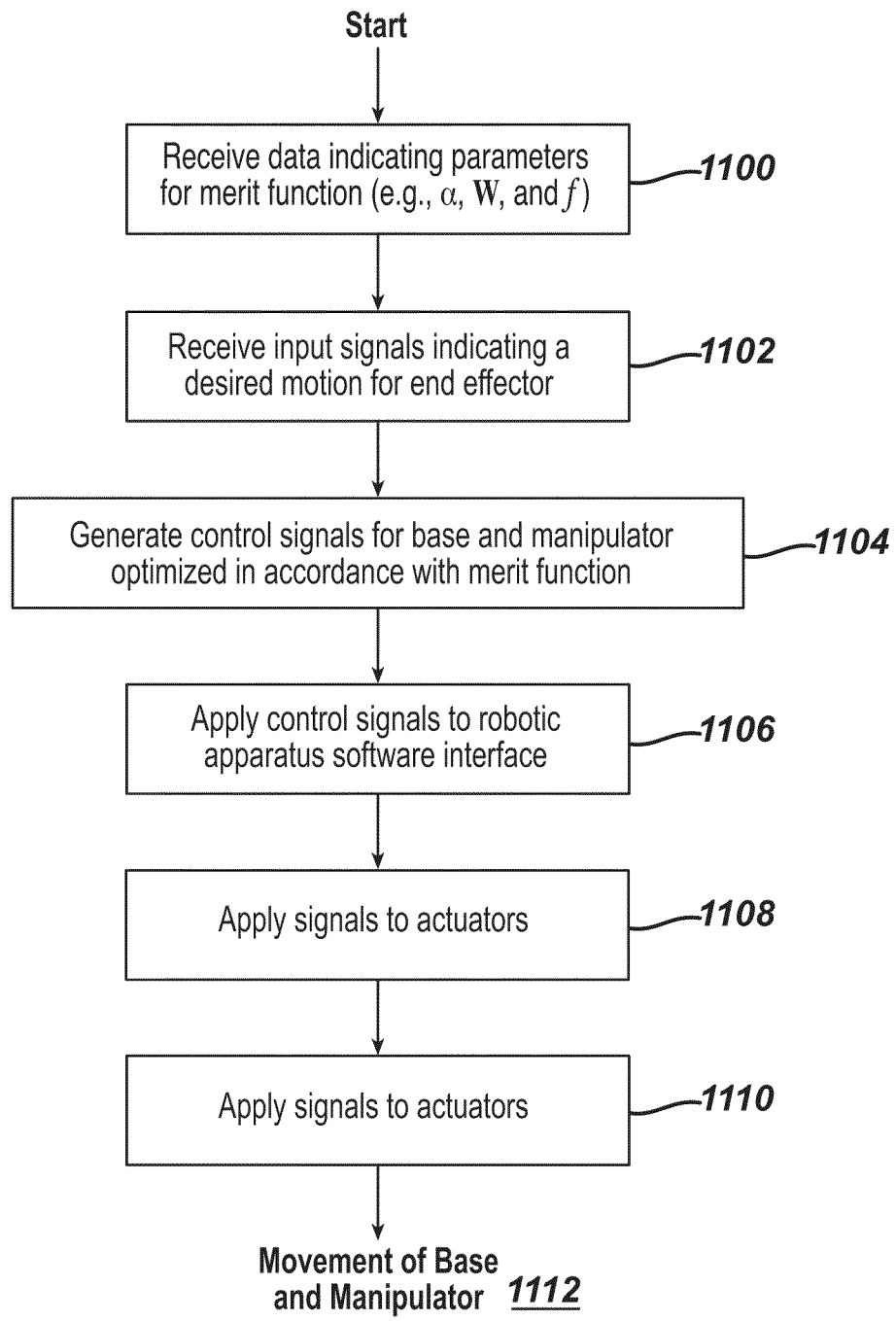
FIG. 11 shows an exemplary flow diagram of steps to be executed by digital data processor(s) of the control system shown in FIG. 9.

FIG. 11 depicts an exemplary flow-chart of steps that can be executed in a digital data processing system, e.g., as shown in FIGS. 9-10, that functions in accordance with the teachings herein. As shown in FIG. 11, in step 1100 the system can receive data indicating the selected control strategy, e.g., as represented by a merit function to be optimized with parameters $\alpha$, W, and $f$ as described above in connection with Equation (3). Further, the system can receive input signals indicating a desired motion at step 1102. Such input signals may take the form of desired velocity vector V for an end effector (e.g., as described above in connection with equations (1) and (2)), which can take the form of an m-length vector. In step 1104, the system can generate control signals (in some cases the control signals can represent control vectors representing a temporal rate of position changes for each joint, as described above in connection with $\dot{q}$, for example). The control signals can be optimized in accordance with the merit function (such as equation (3), for example) and/or selected control strategy. In many embodiments, the control signals can be generated using equation (2). In step 1106, the control signals can be applied to a robotic apparatus being controlled, e.g., to the software interfaces provided for that apparatus, which can apply the proper signals to actuators to effect movement (e.g., the position changes mentioned above.) In other embodiments, the apparatus software interfaces may be omitted or unnecessary and the control signals applied to the actuators directly. At 1112, the apparatus exhibits the desired and optimized motion. In many cases, such motion involves simultaneously moving a mobile base and other movable elements (e.g., making up a manipulator).

E. Examples & Simulations

By way of further illustration, the following examples are included to further elucidate, among other things, the principles described above. The examples include exemplary simulations provided via software toolkits developed in accordance with the teachings disclosed herein. It should be understood that the information presented in connection with these examples is provided for illustrative purposes and is not intended to necessarily show optimal results that can be achieved or that need to be achieved by employing control systems and methods in accordance with the teachings of this application.

Examples 1 and 2

Coordination Control For Mobile Base

Presented below are two simplified kinematic simulations—a one degree-of-freedom sliding end effector and a planar end effector. The term end effector used here refers to controlling the base as an end effector. In a kinematic simulation, any link, including the base, can be treated as an end effector. Many different kinds of end effectors are implemented in the Actin software toolkits. The naming of these end effectors usually reflects kinematic restrictions rather than functions. For example, a point end effector indicates that the three dimensional position of the end effector needs to match that position with the desired one (the origin of the guide frame in the GUI. The guide frame is a visualization of a set of three orthogonal axes that shows the desired position and orientation for the end effector; for a point end effector, the orientation does not matter. The frame end effector can match the guide frame in both position and orientation. In the GUI, the user manipulates the guide frame via mouse or other input devices and the selected end effector follows the guide frame in a different way based on the different end effector type. Note that there can be more than one end effector active at the same time. For example, if the base of the robot has been assigned to a frame end effector and its gripper has been assigned to another; then manipulating the gripper's guide frame will move the gripper around while keeping the base fixed.

This example illustrates coordinated motion between an arm and the base. In this case, the sliding end effector mentioned above will be assigned to the base and it will allow the base to move back and forth, no turning or side moves. The guide frame for the base's sliding end effector is not moving; we only move the gripper's guide frame. The planar end effector works in a similar fashion. Instead of allowing the base moving back and forth; the base can move freely on the x-y plane (with z pointing up). Note that the tracks will not be able to move side ways, so any velocity in the side direction needs to be filtered out. The following sub-sections explain in detail how these end effectors and the filter are implemented.

Example 1

Implementation of Sliding End Effector for the Base

In this example the mobile base is modeled after an end effector which exhibits sliding motion. In other words, constraints are placed on the movement of a mobile base, e.g., to model those constraints that might exist with real bases.

The relation between the end effector velocity and the joint velocity can usually be written as the Jacobian equation:

$$V = J(q)\dot{q}, \tag{59}$$

where V is an m-length vector representation of the motion of the end effectors; q is an n-length vector of joint and base positions (with $\dot{q}$ being its time derivative); and J is the m×n Jacobian matrix as function of q. This example will illustrate control of the mobile base as a single degree of freedom mechanism that can move forward and backward. One way to achieve this is to model the mobile base as a six degree of freedom object and apply a five degree of freedom constraint on it. We define a frame attached to the base and assume the base can only move in the frame's x direction; its orientation and y, z coordinates will not change. This part of Jacobian is written as $$\begin{bmatrix} v_e \\ w_e \end{bmatrix} = \hat{J}(q) \begin{bmatrix} \theta_0 \\ \vdots \\ \theta_k \\ v_b \\ w_b \end{bmatrix}, \quad (60)$$

where $v_e$ and $w_e$ are the linear and angular velocity of the end effector frame in the system coordinates; $v_b$ and $w_b$ are the linear and angular velocity of the base in the system coordinates. Note that $\hat{J}(q)$ is only part of the whole Jacobian matrix that corresponding to the constraint of this end effector. The relation between $v_e$, $w_e$ and $v_b$, $w_b$ can be written as $$\begin{bmatrix} v_e \\ w_e \end{bmatrix} = \begin{bmatrix} v_b + w_b \times^b p_e \\ w_b \end{bmatrix} = \begin{bmatrix} I & \begin{bmatrix} 0 & p_z & -p_y \\ -p_z & 0 & p_x \\ p_y & -p_x & 0 \end{bmatrix} \\ 0 & I \end{bmatrix} \begin{bmatrix} v_b \\ w_b \end{bmatrix} \quad (61)$$

where $p_e = [p_x\ p_x\ p_x]^T$ is the linear transformation from the base frame to the end effector frame represented in the base frame. Since the constraints are given in the end effector frame and the end effector velocities are calculated in the system coordinates, these vectors will be converted into the end effector's frame, as follows:

$$\begin{bmatrix} v_f \\ w_f \end{bmatrix} = \begin{bmatrix} Rv_e \\ Rw_e \end{bmatrix} = \begin{bmatrix} R & 0 \\ 0 & R \end{bmatrix} \hat{J}(q) \begin{bmatrix} \theta_0 \\ \vdots \\ \theta_k \\ v_b \\ w_b \end{bmatrix} \quad (62)$$

Therefore the portion of the resulting Jacobian matrix for this end effector is obtained by taking the last five rows of the matrix $$\begin{bmatrix} R & 0 \\ 0 & R \end{bmatrix} \hat{J}(q).$$

This new partial Jacobian matrix is of size 5×(k+6).

The implementation of this class is in Actin-control EcSlidingEndEffector. The robot (e.g., iRobot's Packbot) base end effector frame has x pointing forward, z pointing up and the y pointing the side way. With this end effector defined to the base, the base can move forward and backward; which add one more degree of freedom to the system and makes the arm a 6 degree of freedom arm instead of 5.

Example 2

Planar Motion Base Simulation

Figure 12:
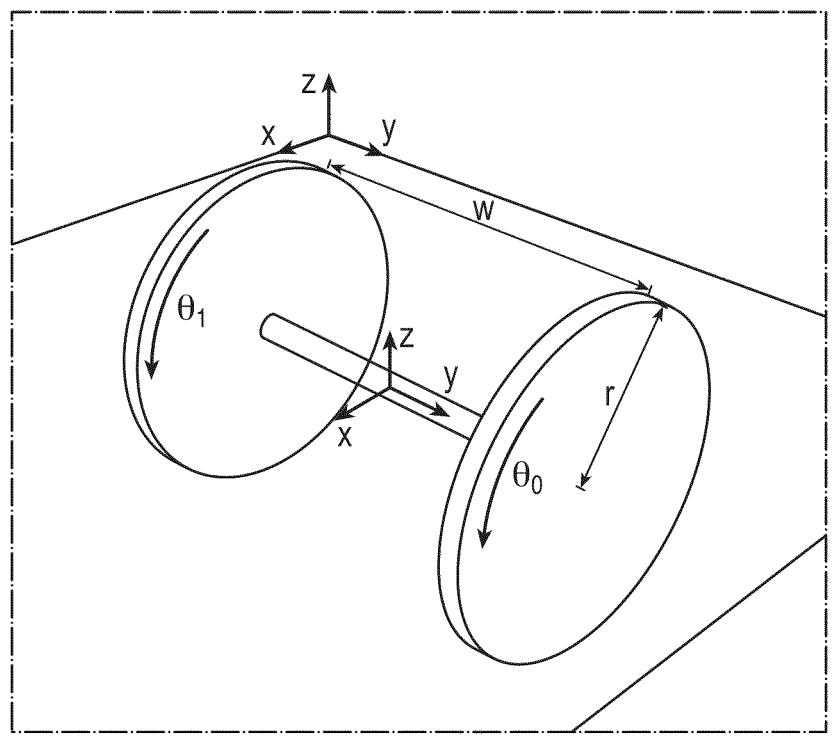
FIG. 12 is a schematic depiction of an exemplary two-wheel model for simulating a mobile base.

This example for the mobile base kinematic simulation illustrates planar motion; where the platform (mobile base) can move in the x-y plane and rotate about the z-axis. An exemplary two-wheeler model for this is shown in FIG. 12. FIG. 12 illustrates the model for mobile platform on a 2-dimensional plan. Distance between the wheels is equal to w, wheel radius is equal to r.

With reference to FIG. 12, while the frame attached to the axel has three degrees of freedom (x, y and $\theta_z$), the joints only have two degrees of freedom ($\theta_0$ and $\theta_1$). The relation between the joint velocity and the frame velocity can be written as:

$$\begin{bmatrix} \dot{x} \\ \dot{y} \\ \dot{\theta}_z \end{bmatrix} = \begin{bmatrix} \dfrac{r\cos\theta_z}{2} & \dfrac{r\cos\theta_z}{2} \\ \dfrac{r\sin\theta_z}{2} & \dfrac{r\sin\theta_z}{2} \\ -\dfrac{r}{w} & \dfrac{r}{w} \end{bmatrix} \begin{bmatrix} \dot{\theta}_0 \\ \dot{\theta}_1 \end{bmatrix} \quad (63)$$

Note that the Jacobian matrix relating the linear velocity $\dot{x}$, $\dot{y}$ of the end effector and the joint angle velocities $\theta_0$ and $\theta_1$ is singular; meaning position error can not be corrected through end effector control if there is no angular error.

One way to solve this problem is to correct the position error by rotating the platform to the direction of desired linear velocity, then move the platform forward or backward. Once the position error is minimized, the angular error can be corrected. This procedure can be implemented in our control software using an end effector velocity filter. Instead of using equation (63), we can follow the similar steps as in the previous example. First, we form the Jacobian matrix for the end effector velocity represented in the end effector frame as in equation (62). That is, we treat the base as a 6 degree of freedom object in space. Then we let the base move freely in x, y and $\theta_z$ by dropping the first ($\dot{x}$), second ($\dot{y}$) and the sixth ($\theta_z$) rows of the Jacobian matrix $$\begin{bmatrix} R & 0 \\ 0 & R \end{bmatrix} \hat{J}(q);$$

which results in a Jacobian matrix of size 3×(k+6). The implementation of this class is in actin-control EcPlanarEndEffector.

In this example, a constraint is placed on the base such that the tracks cannot move in y (side ways). To achieve this, the planar end effector can be combined with a velocity filter to restrict the mobile platform from sideways (y) motions. The resulting velocity of this filter is achievable with tracks (e.g., a tracked mobile robot).

The planar end effector acts as a restriction which adds 6 elements to the joint positions q in the Jacobian equation:

$$V = J(q)\dot{q}, \quad (64)$$

and 3 velocity terms to V. For this portion of the Jacobian equation, it can be written as $$\begin{bmatrix} z \\ w_x \\ w_y \end{bmatrix} = \hat{J}(q) \begin{bmatrix} \theta_0 \\ \vdots \\ \theta_k \\ v_b \\ w_b \end{bmatrix}, \quad (65)$$

where z is the linear velocity represented in the end effector frame (a frame attached to the mobile platform). $w_x$ and $w_y$ are the angular velocities of the end effector frame in the end effector coordinates; $v_b$ and $w_b$ are the linear and angular velocities of the DH frame of the mobile platform in the system coordinates. Note that there is a DH frame and a primary frame defined in each link. DH frames are defined for the kinematics and primary frames are the coordinates system defined for the CAD model of each link. There can be offset between the DH frame and the primary frame in each link. Also note that the end effector frame is defined with respect to the primary frame. Therefore when filtering the joint velocities for the base, $v_b$ and $w_b$ given in the DH frame, we need to convert them to velocity of the end effector frame represented in the end effector frame. Exemplary pseudo code is listed as below:

```
EEToDHInSystem = baseEEFrameInSystem.translation( ) −
        baseDHFrameInSystem.translation( );
EEVelocityInSystem =
DHVelocityInSystem.transformBy(EEToDHInSystem);
EEVelocityInEE =
EEVelocityInSystem.transformBy(baseEEFrameInSystem.orientation( ).-
inverse( ));
filteredEEVelInEE = EEVelInEE;
// only thing we did here is setting the side velocity y to 0
filteredEEVelInEE.setLinearY(0.0);
// convert velocity back in system coordinates.
filteredEEVelInSystem =
    filteredEEVelInEE.transformBy(baseEEFrameInSystem.orientation( ));
// calculate the corresponding velocity at the DH frame
filteredDHVelInSystem =
        filteredEEVelInSystem.transformBy(−EEToDHInSystem);
```

In this example, the side movement velocity can be set to 0. Depending on the desired behavior of the tracks, different behaviors can be introduced as needed by adding new types of velocity filters. Special attention can be paid to the different frames (primary, DH and end effector frames). Denavit-Hartenberg (DH) parameters specify the reference frame of any link in a robotic system with respect to an adjacent link. In this way, for a connected chain of links, the position and orientation of each link is specified relative to the position and orientation (reference frame) of an adjacent link.

Figure 13:
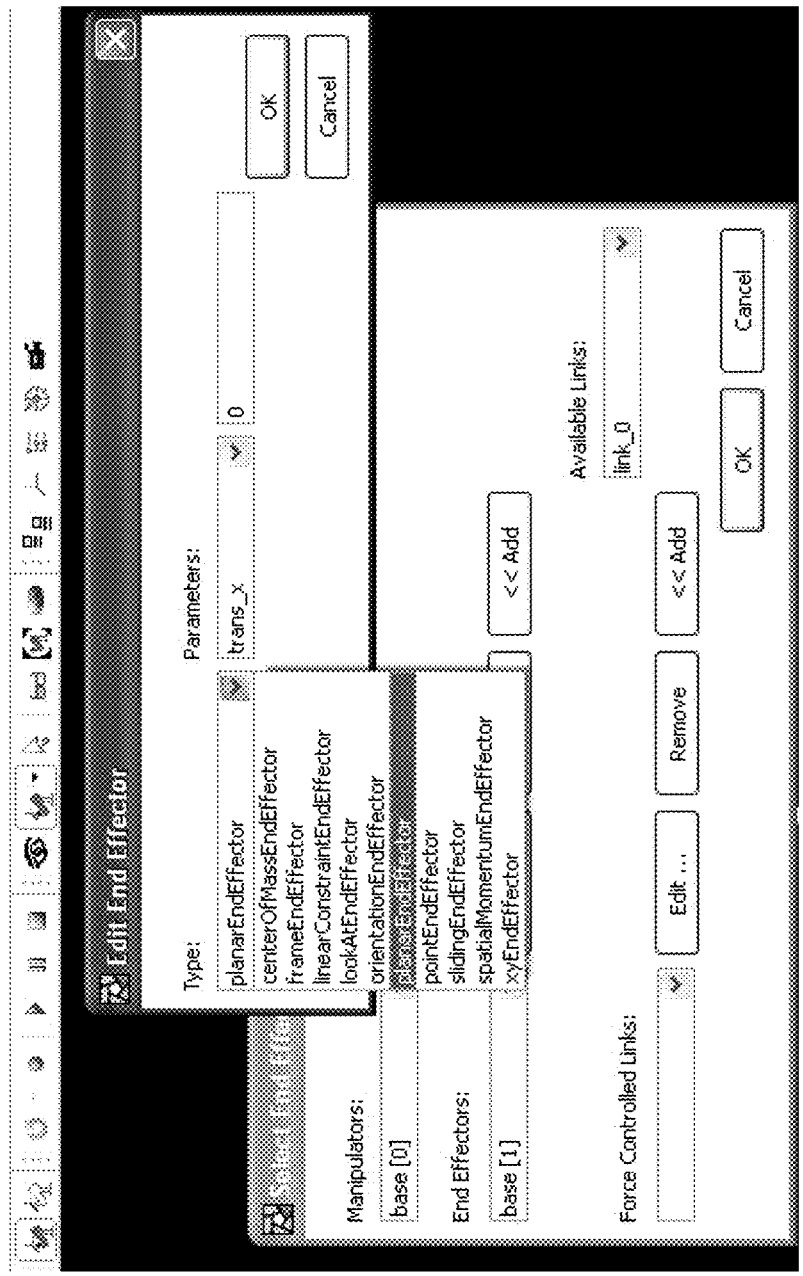
FIG. 13 shows an exemplary dialog box illustrating the selection of end effector types and parameters.

One exemplary filter is a joint rate filter implemented in the class in Actin-control EcControlExpressionJointRateFilter. The planar tracks filter and the joint rate filter are applied sequentially. The end effector and the end effector frame defined with respect to the primary frame can be changed on the fly through the GUI. The end effector dialog allows the user to select a manipulator in the system and the desired link in the manipulator. In this case (see FIG. 13) we want to assign a planar end effector to the base. A pull down menu, illustrated in FIG. 13 shows a dialog box for assigning end effectors and setting up parameters, which has a variety of implemented end effectors. For each type of end effector there is a list of associated parameters. The user can change the parameter values through the dialog box.

A demo is created with the newly implemented sliding end effector and the planar end effector combined with the planar tracks filter to demonstrate the coordinated arm and mobile platform motion. The arm or manipulator (e.g., an explosive ordinance disposal arm or EOD) is typically operated with the robot base fixed. The new control scheme provides a way to operate them together. This can have the advantage of giving the operator a single interface that is more intuitive. In addition, the integrated system has more degrees of freedom than operating the base and arm separately. This higher degree of freedom provides many benefits when dealing with collision avoidance, joint limit avoidance and many other secondary goals. In the simulation we assigned a point end effector (restricts just the location but not the orientation) to the camera and a planar end effector to the base. We moved the desired camera end effector position by dragging a guide frame in the viewer and the camera follows. In the simulation it can be seen that:
1. The integrated system has more degrees of freedom, has a larger workspace, and can be controlled through a single user interface.
2. The planar end effector and the planar tracks filter effectively constraint the mobile base to behave like a tracked mobile platform; it can move back and forth and can spin, but cannot move sideways.
3. We defined a rough bounding volume for each link for self-collision avoidance. The arm will automatically avoid hitting any other link in the system without the operator's attention.

Operator Control Unit (OCU) With Multiple Views

In one embodiment, an operator control unit can provide a user with multiple views, such as an on-the-arm camera view and a fish-eye view from a mobile platform. A user can select from different modes (drive, manipulate . . . etc.) to finish the goal. The arm may need to be driven differently when the camera on the arm is looking in different directions, in some cases. Through experiences drawn from human computer interfaces, often WYSIWYG (what-you-see-is-what you-get) can provide an intuitive way of connecting the human and the machine. It can be advantageous to provide the operator a way to control the arm with respect to an individual camera view (e.g., with respect to the local coordinate frame of that individual camera view). For example, upon a particular view being brought into focus (e.g., via view selection by a user), the user interface (e.g., the user interface software) can switch to the mode that is tied to that current view; a seamless mode change. The operator can give a desired end effector pose with respect to the current camera view; the software can translate the command to target joint angles automatically without the operator's attention and/or input. The operator can place the 3D cursor in each of the views exactly the same way as in any other view.

For example, a viewer (e.g., Actin viewer) supports rendering multiple views by defining multiple virtual cameras for simulation purposes.

For simulating or controlling a robot with mobile base, it is advantageous in many cases to set up a camera view from the camera near the end of a robot arm or at an intermediate link along the arm. For example, we can set the arm camera to look at a gripper or other end effector, but it can also be set to look at any other part of the system. A typical camera may pan and tilt with respect to an arm link. Alternate cameras are often placed on the mobile base to provide a broader view of the robot arms or of the environment around the robot. In addition, virtual cameras can be placed anywhere in the 3D simulation and control environment, allowing views of the simulated robot pose and control of the actual robot from any view angle. In some embodiments, actual cameras can also be used, either in addition to or in place of virtual cameras.

The multiview approach can show multiple views of the robot on the OCU display. The multiview OCU can allow for direct control of the robot from any of the views, using a single active guide frame among all views or by using separate guide frames per view. Direct control can be done in the local coordinate frame of the selected window, making it intuitive and flexible.

Extensible Framework for User Input with Multiple Shared Views

User input can be handled in a way that expands the ease of user input for all windows, including a main window as well as alternate windows, child windows, and/or sub windows. There is a new framework for registering input handlers, which allows for expansion and modification of the behavior of input events. A set of classes was created in the Actin toolkit to provide several levels of input control. These classes can be extended or overridden to create custom behavior.

EcSGBaseInputHandler—provides base class for framework to set and retrieve camera position and orientation. This class does not provide user input control; only explicit camera placement is allowed with this class. This corresponds with the previous behavior of EcSGWindow.

EcDefaultInputHandler—A general class that takes user input events, such as from a mouse or keyboard or touchscreen and processes them for the current window. Example default behavior is left mouse button controls camera view (rotation and translation in x,y) and right mouse button manipulates the end-effector; middle mouse controls zooming for camera or end-effector (z translation). This is the default input handler for EcBaseViewerMainWidget.

Examples 3 & 4

Free Base Kinematics Simulations

Figure 14:
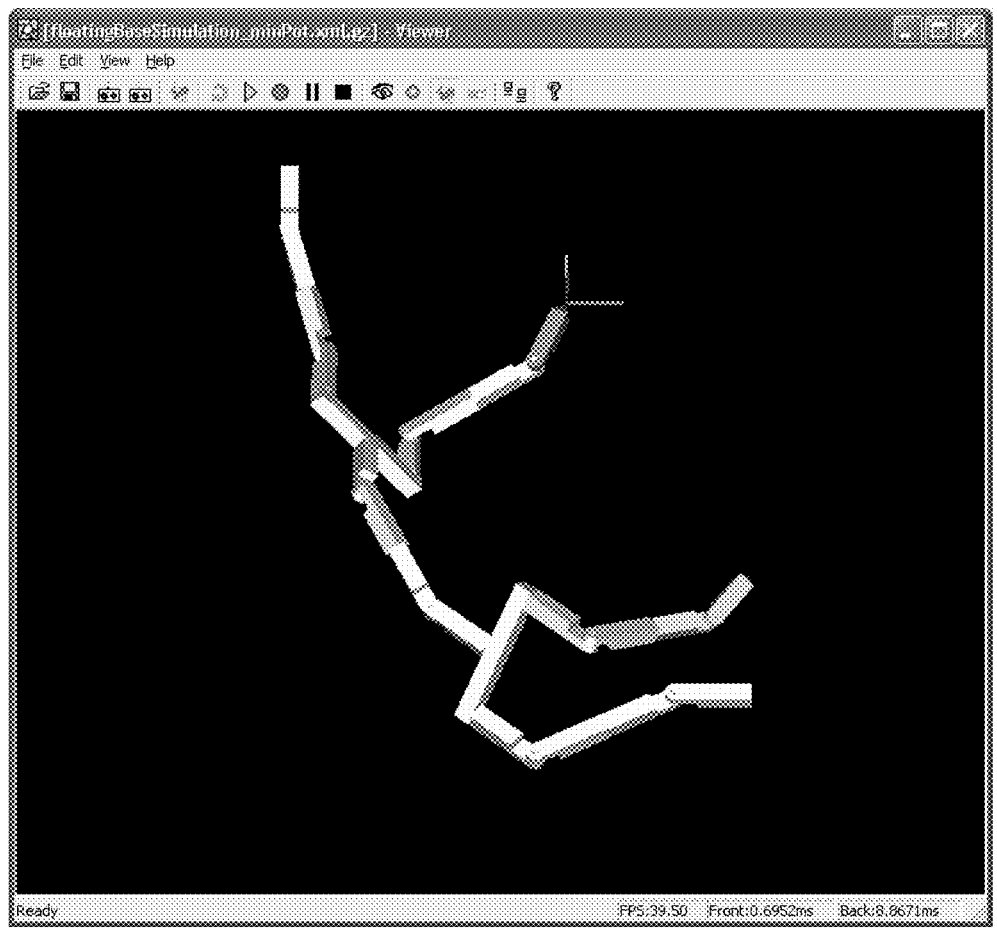
FIG. 14 shows an exemplary free-floating mechanism in simulation.
Figure 15A:
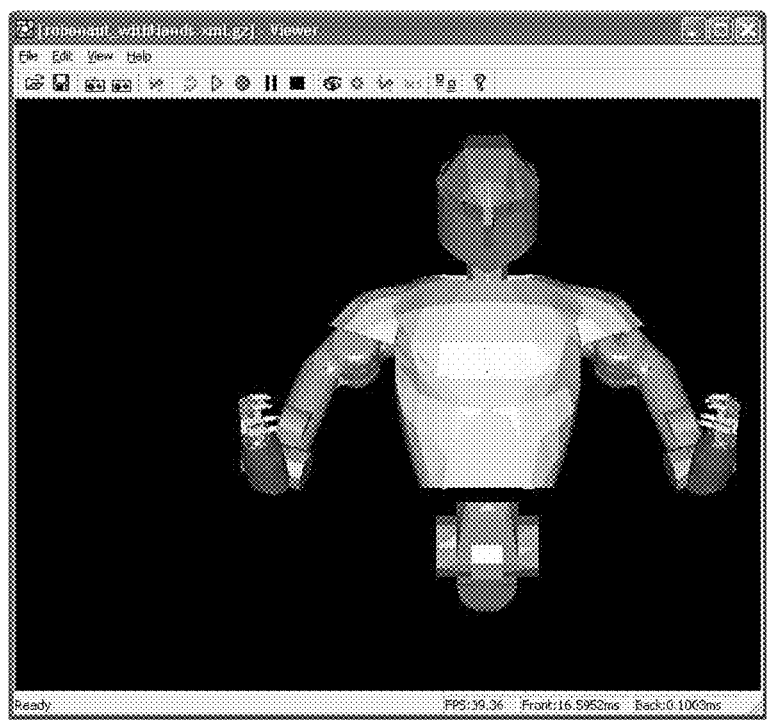
FIGS. 15A-15D show a sequence of images of a exemplary model in free-base mode simulation.
Figure 15B:
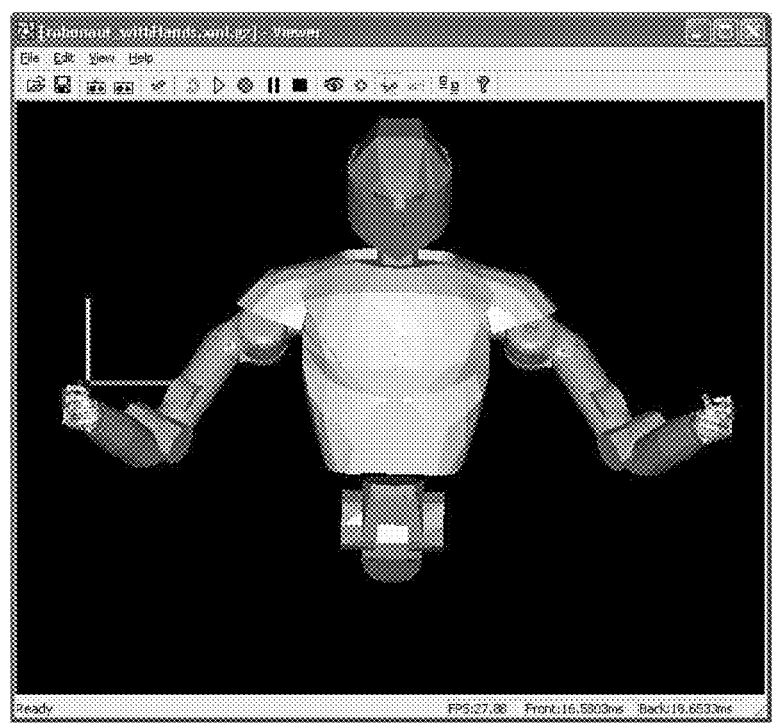
Figure 15C:
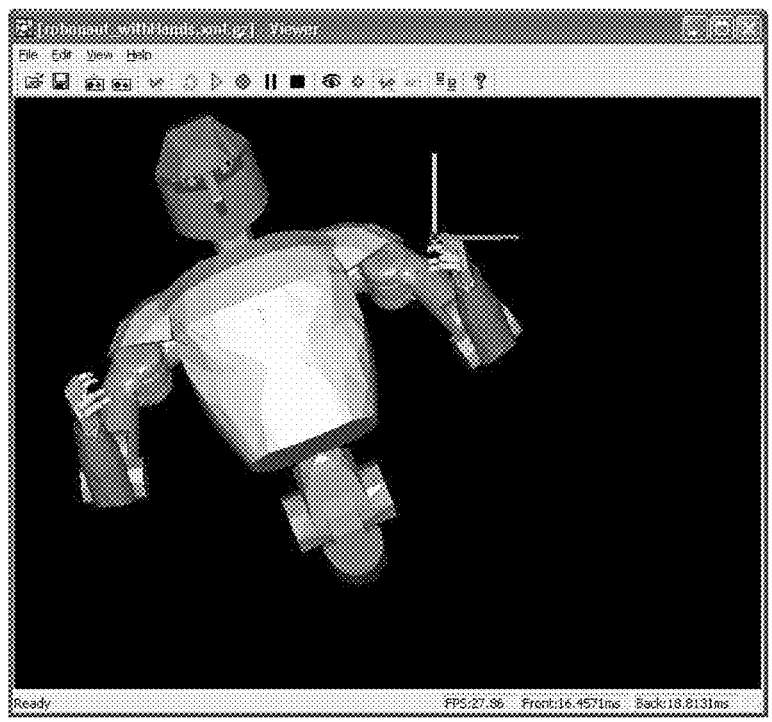
Figure 15D:
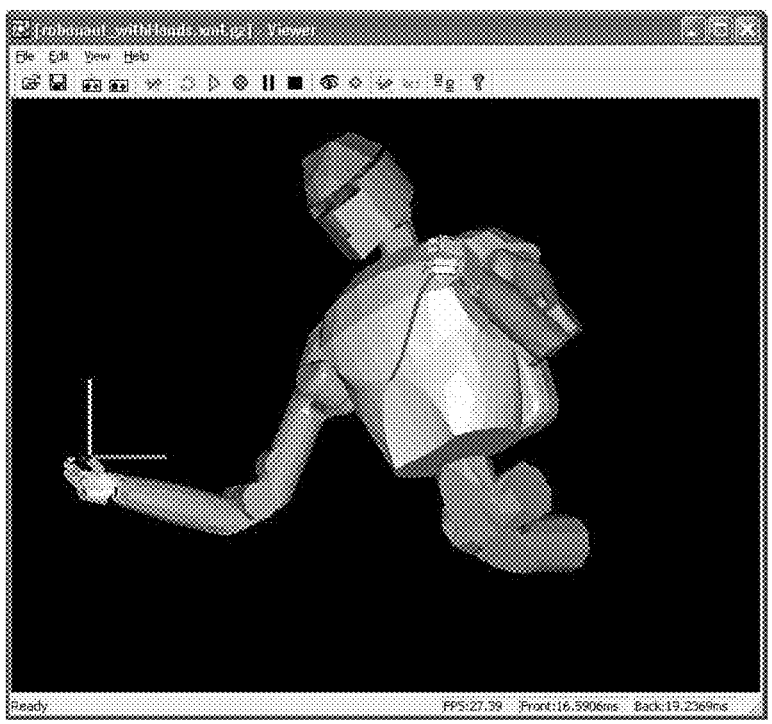

These simulations involve free-base kinematics focusing on achievable robot configurations, independent of inertia involved in moving to a desired configuration. FIG. 14 shows an example 21-joint (27-degree of freedom, including base motion) free-floating mechanism placing two frame end effectors and two point end effectors. The mechanism has 21 joints and 4 end effectors and is being kinematically controlled. This simulated mechanism is built into code base for use in self-tests of the free-base code. It illustrates the ability of the toolkit to support a variety of complex mechanisms.

FIGS. 15A-15D show the 57-link Robonaut model moving in free-base mode. FIGS. 15A-15D represent a sequence of images (from the same viewpoint) of the Robonaut model in free-base mode sequentially placing fingers of opposing hands. In free-base mode, all links on the manipulator are free to move. The only constraints are the end effectors. The toolkit can be used to support hand-over-hand movement of Robonaut when it is fielded.

Example 5

Dynamic Simulation

This example involves dynamic simulations which include modeling of motion-related properties such as inertia. It illustrates how two dynamic simulation methods for fixed bases, the Articulated Body Inertia Algorithm and the Composite Rigid-Body Inertia Algorithm, can be extended to support simulating free-base manipulators. The Order(N) Articulated Body Inertia algorithm is best for very large manipulators, while the Order($N^3$) Composite Rigid-Body Inertia algorithm is best for smaller manipulators.

Composite Rigid-Body Inertia Simulation Algorithm

For fixed-base manipulators, dynamic simulation is implemented using an adaptation of the composite rigid-body algorithm for bifurcating manipulators. For more information on such algorithms, see M. W. Walker and D. E. Orin, "Efficient Dynamic Computer Simulation of Robotic Mechanisms," Journal of Dynamic Systems, Measurement, and Control, 104, 205-211, 1982 and A. Fijany and A. K. Bejczy, "An Efficient Algorithm for Computation of Manipulator Inertia Matrix," Journal of Robotic Systems, 7(1), 57-80, 1990, both of which are hereby incorporated by reference.

This algorithm runs in Order($N^3$) time, for N links

The fixed-base composite rigid-body inertia algorithm uses the following dynamics equation:

$$\tau = M(q)\ddot{q} + C(q)\dot{q} + G(q) + B, \tag{66}$$

where $\tau$ is the column vector of joint torques/forces, $M(q)$ is the manipulator inertia matrix, q is the vector of joint position, $C(q)$ represents the Coriolis forces, $G(q)$ represents gravitational forces, and B represents the effect of external forces applied to the arm's links. This equation, as shown, is only valid for a manipulator with a fixed base. When the base is free, it must be modified.

For any frames i and j that are rigidly connected, Let $^jP_{j \to i}$ be the cross-product matrix for $^jp_{j \to i}$, the vector from the origin of frame i to the origin of frame j, expressed in frame j. And let $^jR_i$ be the rotation matrix expressing frame i in frame j. Using this, let the matrices $_FT_{i \to j}$ and $_AT_{i \to j}$ be defined as follows:

$$_FT_{i \to j} = \begin{bmatrix} ^jR_i & 0 \\ ^jP_{j \to i}\,^jR_i & ^jR_i \end{bmatrix}, \tag{67}$$

and $$_AT_{i \to j} = \begin{bmatrix} ^jR_i & ^jP_{j \to i}\,^jR_i \\ 0 & ^jR_i \end{bmatrix}. \tag{68}$$

These transformations produce the following equalities:

$$F_j = {_FT_{i \to j}} F_i, \tag{69}$$

and $$A_j = {_AT_{i \to j}} A_i. \tag{70}$$

For any rigid body, let $\vec{f}$ be the vector force applied to the link, $\vec{n}$ be the moment, $\vec{\omega}$ be the angular velocity, $\vec{v}$ be the linear velocity, $\vec{f}_a$ be an a priori external force applied to the body, $\vec{n}_a$ be an a priori moment applied to the body, m be the mass, H be the cross-product matrix for the first moment of inertia, and J be the second moment of inertia. Then, the force/moment equations are given by the following:

$$\vec{f} = H^T \dot{\vec{\omega}} + \vec{\omega} \times H^T \vec{\omega} + m\dot{\vec{v}} - \vec{f}_e. \tag{71}$$

$$\vec{n} = J\dot{\vec{\omega}} + \vec{\omega} \times J\vec{\omega} + H\dot{\vec{v}} - \vec{n}_e. \tag{72}$$

Let the 6×6 rigid-body inertia be defined as follows:

$$I^C = \begin{bmatrix} mI & H^T \\ H & J \end{bmatrix}. \tag{73}$$

And let a bias frame force be defined as $$B = \begin{bmatrix} \vec{\omega} \times H^T \vec{\omega} \\ \vec{\omega} \times J\vec{\omega} \end{bmatrix} + \begin{bmatrix} -\vec{f}_a \\ -\vec{n}_a \end{bmatrix}. \tag{74}$$

With this, the rigid-body dynamics can be represented as $$F = I^C A + B. \tag{75}$$

Effect of Base Acceleration on Joint Torque

Figure 16:
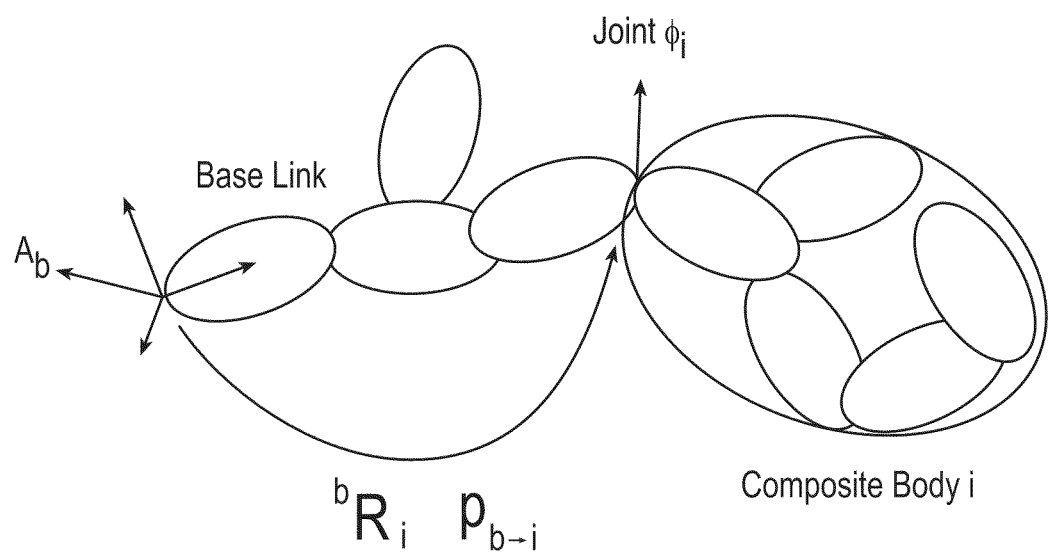
FIG. 16 shows an exemplary model for joint torque which accounts for base acceleration.

When the base link is free to move, the force on and acceleration of the base affects the manipulator dynamics. The affect of the base acceleration on any joint can be found by fixing all other joints and finding the torque required by the joint to sustain the acceleration on the composite rigid body outboard from the joint. This is illustrated in FIG. 16, which shows how in this model the torque produced on joint i due to the acceleration of the base is the torque required to accelerate all the outboard links from the joint. This is an additive term, found by assuming all other joints are stationary.

For the base joint, let the a priori external force and moment be divided into two components. Let $\vec{f}_e$ an external force applied to the base, $\vec{n}_e$ be an external moment applied to the body, $\vec{f}_m$ be the force applied by child links to the base, and $\vec{n}_m$ be the moment applied by child links. With this, $\vec{f}_a = \vec{f}_e + \vec{f}_m$ and $\vec{n}_a = \vec{n}_e + \vec{n}_m$. Then the bias force is given by $$B = \begin{bmatrix} \vec{\omega} \times H^T \vec{\omega} \\ \vec{\omega} \times J\vec{\omega} \end{bmatrix} + \begin{bmatrix} -\vec{f}_e - \vec{f}_m \\ -\vec{n}_e - \vec{n}_m \end{bmatrix}. \tag{76}$$

The torque on joint i due to acceleration $A_b$ can be found by assuming an otherwise stationary manipulator, with all other rates and accelerations zero. With this assumption, the base frame acceleration can be expressed in frame i using (70), the frame force required to move the outboard composite rigid body calculated using (75), and the joint torque calculated by taking the inner product of this force with $\phi_i$. This gives the torque on joint i due to base acceleration as the following:

$$\tau_i^A = \phi_i^T I_i^C ({}_A T_{b \to i}) A_b. \tag{77}$$

Let the matrix D be defined as follows:

$$D = \begin{bmatrix} \phi_0^T I_0^C ({}_A T_{b \to 0}) \\ \phi_1^T I_1^C ({}_A T_{b \to 1}) \\ \vdots \\ \phi_{n-1}^T I_{n-1}^C ({}_A T_{b \to n-1}) \end{bmatrix}. \tag{78}$$

This can be evaluated in code by calculating $I_i^C \phi_i$ as the frame force produced by unit acceleration of joint i with all other joints stationary ($I_i^C$ is symmetric), then transforming this force to the base frame using the identity ${}_A T_{i \to j}^T = {}_F T_{j \to i}$, $\forall i,j$.

With this definition, the manipulator dynamics equation becomes $$\tau = M(q)\ddot{q} + C(q)\dot{q} + G(q) + DA_b + B. \tag{79}$$

Note that, because gravitational $G(q)$ is explicit, $A_b$ is the seen (rather than felt) value.

Changing Reference Frames for Matrix D

Because D applies to the base acceleration, it has a frame of representation, just as the base acceleration does. The formula to change the frame of expression for D from j to i is given by the following (with ${}_A T_{i \to j}$ defined through (68)):

$$^i D = {}^j D ({}_A T_{i \to j}). \tag{80}$$

Effect Joint Accelerations on the Base Acceleration on Joint Torque

When the base link is free to move, assuming an otherwise stationary manipulator, the force that must be exerted on composite rigid body i for acceleration only by joint i is given by $$F_i = I_i^C \phi_i \ddot{q}_i. \tag{81}$$

Expressing this in the base frame, and changing the sign to represent the effective force applied to the base gives:

$$^b F_i = -{}_F T_{i \to b} I_i^C \phi_i \ddot{q}_i. \tag{82}$$

Summing the contributions of all links and using the identity ${}_F T_{i \to j}^T = {}_A T_{j \to i}$, $\forall i,j$ gives the following remarkable reuse of the matrix D to calculate the force $F_{ma}$ applied to the base as a result of manipulator joint accelerations.

$$F_{ma} = -D^T \ddot{q}. \tag{83}$$

Let the total force applied by the manipulator to the base be $$F_m = F_{ma} + F_{mc} + F_{mg} + F_{me}, \tag{84}$$

where $F_{mc}$, $F_{mg}$, and $F_{me}$ represent the force due to Coriolis and centripetal terms, gravity, and external forces, respectively.

If $F_e$ represents the external forces applied to the base link directly, then (75) gives $$F_{ma} + F_e = I_b^C A_b - F_{mc} - F_{mg} - F_{me}, \tag{85}$$

where $I_b^C$ is the composite rigid-body inertia of the entire manipulator, including the base.

Substituting in (83) gives $$D^T \ddot{q} + I_b^C A_b = F_e + F_{mc} + F_{mg} + F_{me} \tag{86}$$

Combining this with (79) gives a new manipulator dynamics equation $$\begin{bmatrix} I_b^C & D(q)^T \\ D(q) & M(q) \end{bmatrix} \begin{bmatrix} A_b \\ \ddot{q} \end{bmatrix} = \begin{bmatrix} F_e + F_{mc} + F_{mg} + F_{me} \\ \tau - C(q)\dot{q} - G(q) + B \end{bmatrix}. \tag{87}$$

For N joint degrees of freedom, $I_b^C$ is 6×6, D(q) is N×6, and M(q) is N×N. Solving this for $A_b$ and $\ddot{q}$ and time integrating these gives the free-base composite rigid-body algorithm. In concatenating $A_b$ and $\ddot{q}$, $A_b$ is placed on top of $\ddot{q}$ to simplify the calculation of the Cholesky Decomposition of the left-hand matrix in (87). Note that this matrix, which must be inverted, is guaranteed not to be singular for a real system (otherwise acceleration could be achieved with no force).

Solving for the Accelerations

Let $$\overline{M}(q) = \begin{bmatrix} I_b^C & D(q)^T \\ D(q) & M(q) \end{bmatrix}, \tag{88}$$

$$\overline{q} = \begin{bmatrix} A_b \\ \ddot{q} \end{bmatrix}, \tag{89}$$

and $$\overline{\tau} = \begin{bmatrix} F_e + F_{mc} + F_{mg} + F_{me} \\ \tau - C(q)\dot{q} - G(q) + B \end{bmatrix}. \tag{90}$$

With these definitions, (87) becomes $$\overline{M}(q)\overline{q} = \overline{\tau} \tag{91}$$

an (N+6)-dimensional fully constrained linear equation. Cholesky Decomposition (decomposition into a lower-triangular square root) is ideal for solving this for $\bar{q}$ because $\overline{M}(q)$, like $M(q)$, is positive definite. In this approach, $\overline{M}(q)$ is decomposed as follows:

$$\overline{M} = \overline{L}\overline{L}^T, \quad (92)$$

with $\overline{L}$ lower triangular.

The constness of $I_b{}^C$ can be exploited in the calculation of $\overline{L}$. Let $I_b{}^C$ be decomposed as $$I_b{}^C = L_b L_b{}^T, \quad (93)$$

with $L_b$ lower triangular. $L_b$ is constant and only needs to be calculated once.

Let E be the N×6 matrix satisfying the following:

$$L_b E^T = D^T, \quad (94)$$

which can be solved using back substitution with $L_b$, and let $L_M$ be defined such that $$M(q) - EE^T = L_M L_M{}^T. \quad (95)$$

This can be solved using Cholesky decomposition on an N×N matrix.

With these values, $\overline{L}$ is evaluated as $$\overline{L} = \begin{bmatrix} L_b & 0 \\ E & L_M \end{bmatrix}, \quad (96)$$

Using (73) and (93), $$\overline{L}_b = \begin{bmatrix} \sqrt{m}\,I & 0 \\ 1/\sqrt{m}\,H & L_J \end{bmatrix}, \quad (97)$$

Where $L_J$ is lower triangular, and $$L_J L_J^T = J - \frac{1}{m} HH^T. \quad (98)$$

Articulated-Body Simulation Algorithm

The articulated-body algorithm is used for simulation in the software toolkit, running in Order(N) time. More information on such an algorithm can be found in R. Featherstone, Robot Dynamics Algorithms, Kluwer Academic Publishers, Boston, 1987, and K. W. Lilly, Efficient Dynamic Simulation of Robotic Mechanisms, Kluwer Academic Publishers, Boston, 1993, both of which are hereby incorporated by reference. This algorithm allows fast simulation of very complex mechanisms.

Articulated Body Inertia

Figure 17:
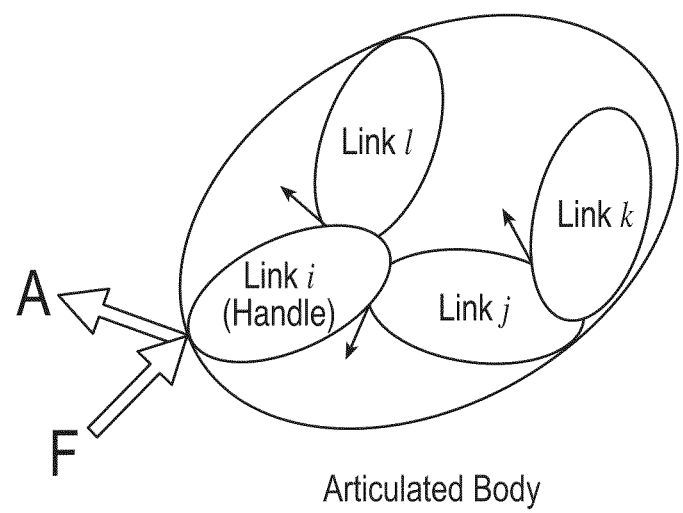
FIG. 17 shows an exemplary illustration of an articulated body comprising a plurality of links; and, FIGS. 18A-18D show a side-by-side comparison of different algorithms used to simulate the movement of free-base mechanisms.
Figure 18A:
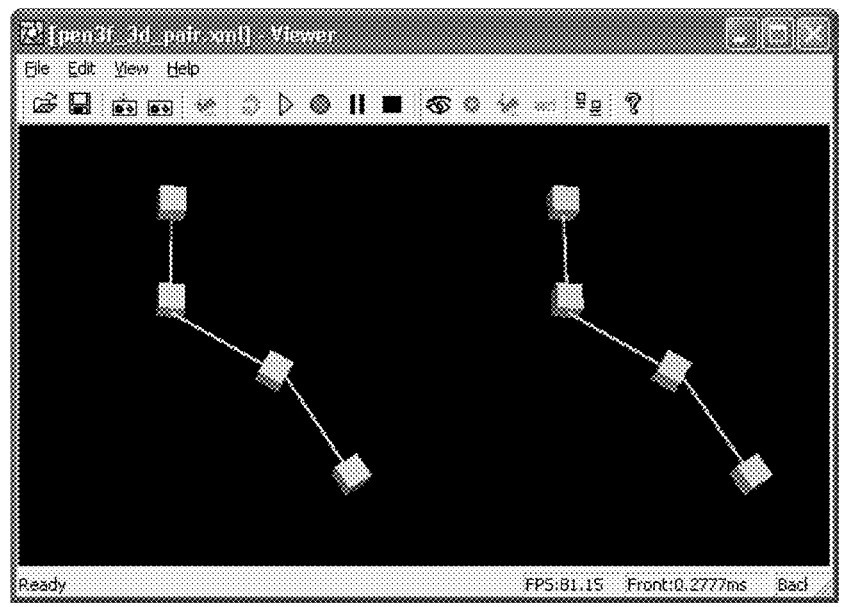
Figure 18B:
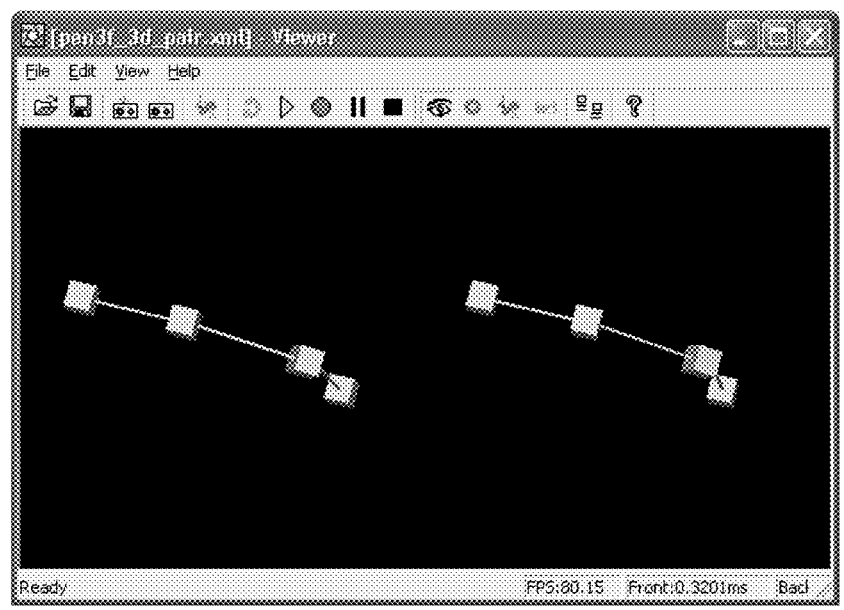
Figure 18C:
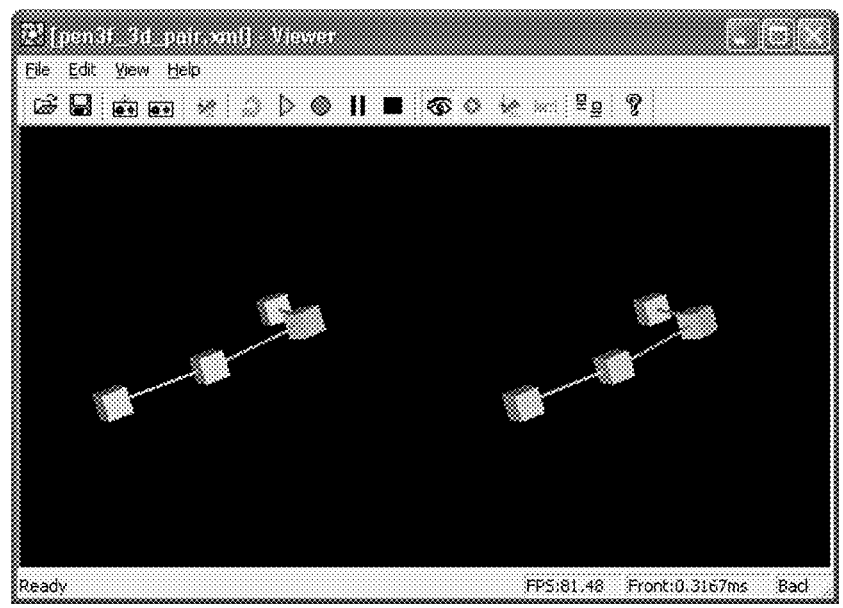
Figure 18D:
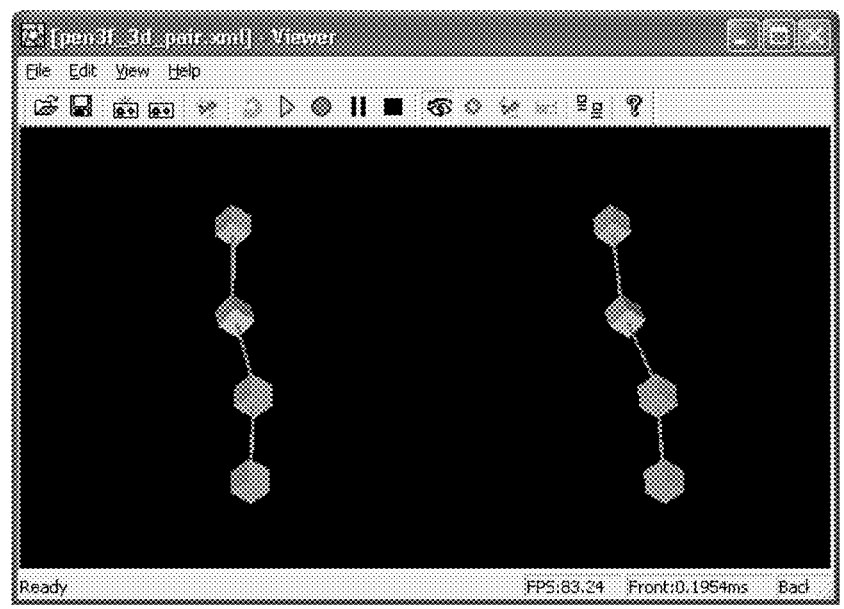

An articulated body is a collection of connected articulating links, as illustrated in FIG. 17. Any single rigid body within the articulated body can be used as a handle for defining the relationship between force and acceleration. The articulated body in FIG. 17 is composed of one or more rigid links connected by articulated joints. One rigid link, in this case link i, is taken as the handle to define the relationship between 6'1 frame force (F) and 6'1 frame acceleration (A).

Associated with any handle is a 6×6 articulated-body inertia $I^A$ that satisfies the following equation for any physically realizable frame acceleration (6×1) A:

$$F = I^A A - B. \quad (99)$$

Here, F is the 6×1 frame force that must be applied to the articulated body to achieve 6×1 frame acceleration A. (For vector force $\vec{f}$, moment $\vec{n}$, linear acceleration $\vec{a}$, and angular acceleration $\vec{\alpha}$, represented as 3×1 column vectors, $F = [\vec{f}^T \vec{n}^T]^T$ and $A = [\vec{a}^T \vec{\alpha}^T]^T$.) The 6×1 frame force B is a bias force that is a function of external forces on the links, internal forces on the links, gravity, and link velocities. B represents all contributors to the force on the link except acceleration A. It is the force required to produce no acceleration of the handle.

The iterative formulas to calculate $I^A$ and B are given by the following:

$$I_k^A = \left( I_j^A + I_i^A - \frac{1}{\phi_j^T I_j^A \phi_j} I_j^A \phi_j \phi_j^T I_j^A \right), \quad (100)$$

$$B_k = \frac{1}{\phi_j^T I_j^A \phi_j}(\tau_j - \phi_j^T B_j) I_j^A \phi_j + B_j + B_i. \quad (101)$$

When the base is free, these equations can be continued to the base link. Then, at the base link, the frame acceleration will be given by $$A_b = (I_b{}^A)^{-1}(F_b - B_b). \quad (102)$$

Here, $A_b$ is the acceleration that is felt, rather than seen. If the frame is stationary with respect to a gravitational field, then $A_b$ will show acceleration upward.

Free-Base Dynamics Simulation

The Articulated-Body Inertia Algorithm and the Composite Rigid-Body Inertia Algorithm were modified for floating-base manipulators as described above. Testing was done by 1) verifying the algorithms conserve energy and momentum and 2) comparing the two independent algorithms for equality of results. FIGS. 18A-18D show side-by-side comparisons of the two algorithms simulating a free-base three-link mechanism.

The teachings of U.S. Pat. No. 6,757,587, titled "METHODS AND APPARATUS FOR DYNAMICALLY REPROGRAMMING REMOTE AUTONOMOUS AGENTS" and issued on Jun. 29, 2004, are hereby incorporated by reference.

One skilled in the art will appreciate further features and advantages based on the above-described embodiments. Accordingly, the claims are not to be limited by what has been particularly shown and described by way of example. The appended claims are incorporated by reference herein and are considered to represent part of the disclosure and detailed description of this patent application.

All publications and references cited herein are expressly incorporated herein by reference in their entirety.

What is claimed is:

1. A method of controlling a robotic apparatus comprising a plurality of movable elements coupled to one another via one or more joints defining one or more degrees of freedom of movement for each of the movable elements, at least one of said movable elements comprising a mobile base for the apparatus, the control method comprising:
   receiving input signals indicating a desired position or motion constraint for at least one of the movable elements;
   generating, based on the input signals, a plurality of control signals to control movement of the mobile base and at least one other movable element to achieve the desired motion by optimizing a pre-defined scalar function of the motion and positions of the movable elements and the mobile base;

applying the control signals to the mobile base and the at least one other movable element to concurrently move the mobile base and the at least one other movable element to effect the desired motion;

wherein the pre-defined scalar function is defined by:

$$\mu = \tfrac{1}{2}\dot{q}^T W \dot{q} + \alpha \dot{q}^T F,$$

where q is a n-length vector representation of the positions of the one or more joints and the mobile base; with $\dot{q}$ being its time derivative (change in position over time); W is a matrix function W(q); F is a vector function of configuration; and α is a scalar function of configuration; and wherein W, F and α are selected to define a control strategy for controlling the robotic apparatus.

2. The method of claim 1, wherein at least one of the movable elements comprises an end effector.

3. The method of claim 2, wherein the end effector comprises any of a gripper, a cutter, a saw, a haptic element, a multi-fingered end effector.

4. The method of claim 1, wherein at least one of the movable elements provides contact with the environment for the purpose of locomotion.

5. The method of claim 1, wherein the mobile base comprises any of a wheel, a track, and a rail.

6. The method of claim 1, wherein the mobile base comprises any of a digging, climbing, and spelunking apparatus.

7. The method of claim 1, wherein the mobile base comprises any of a boat, submarine, and hovercraft.

8. The method of claim 1, wherein the mobile base comprises any of an airplane, helicopter, and air-floating vehicle.

9. The method of claim 1, wherein the plurality of movable elements comprise a robotic arm and a mobile base.

10. The method of claim 1, wherein the input signals are generated by a user input device.

11. The method of claim 10, further comprising, (i) displaying a plurality of views of the robotic apparatus pose to a user, and (ii) allowing the user to control the robotic apparatus from each of the plurality of the views with the user input device.

12. The method of claim 11, wherein the user input device requires only a single user action to switch control between the plurality of the views.

13. The method of claim 11, wherein the plurality of views comprise a plurality of rendered views.

14. The method of claim 10, further comprising, (i) displaying a plurality of views of the robotic apparatus pose to a user, and (ii) allowing the user to control the robotic apparatus from each of the plurality of views with the user input device, and (iii) automatically updating each of the plurality of views based on a user's control input in any one view.

15. The method of claim 1, wherein the input signals are transmitted over any of audio signal, electromagnetic signal, or a computer network.

16. The method of claim 1, wherein the mobile base has two or more degrees of freedom of movement comprising linear velocity and angular velocity.

17. The method of claim 1, comprising applying the control signals to one or more actuators coupled to the one or more movable elements to effect the desired motion.

18. The method of claim 1, wherein the pre-defined scalar function is associated with movement of the robotic apparatus, a gradient of potential energy associated with movement of the robotic apparatus, singularity avoidance, accuracy, joint-limit avoidance, obstacle avoidance.

19. The method of claim 1, wherein the pre-defined scalar function signifies a constraint on movement of at least one movable element.

20. The method of claim 1, wherein the movable elements of the robotic apparatus exhibit, collectively, at least seven degrees of freedom of movement.

21. The method of claim 1, wherein generating the control signals comprises determining control vectors using the following equation:

$$\dot{q} = \begin{bmatrix} J \\ N_J^T W \end{bmatrix}^{-1} \begin{bmatrix} V \\ -\alpha N_J^T F \end{bmatrix}$$

where q is a n-length vector representation of the positions of the one or more joints and the mobile base; with $\dot{q}$ being its time derivative (change in position over time); V is a m-length vector representation of desired motion of at least one of the plurality of movable elements; J is an (m×n) manipulator Jacobian; $N_J^T$ is an n×(n−m) set of vectors defined such that $JN_J^T=0$; W is a matrix function of q; F is a vector function of q; T is a matrix transpose operator; and α is a scalar function of q.

* * * * *